(12) United States Patent
Farah

(10) Patent No.: US 8,393,947 B2
(45) Date of Patent: Mar. 12, 2013

(54) GAMING METHOD AND SYSTEM

(76) Inventor: Anthony Robert Farah, Concord West (AU)

( * ) Notice: Subject to any disclaimer, the term of this patent is extended or adjusted under 35 U.S.C. 154(b) by 40 days.

(21) Appl. No.: 13/021,503

(22) Filed: Feb. 4, 2011

(65) Prior Publication Data

US 2011/0190064 A1 Aug. 4, 2011

Related U.S. Application Data

(63) Continuation-in-part of application No. PCT/AU2009/001015, filed on Aug. 7, 2009.

(51) Int. Cl.
*A63F 9/24* (2006.01)
(52) U.S. Cl. ............... 463/16; 463/11; 463/25
(58) Field of Classification Search .............. 463/11, 463/16
See application file for complete search history.

(56) References Cited

U.S. PATENT DOCUMENTS

2007/0252334 A1 11/2007 McCormick

FOREIGN PATENT DOCUMENTS

WO WO 2006/113628 10/2006

OTHER PUBLICATIONS

Hasbro "Battleship Instructions Pamphlet", 2002, 2 pages.

*Primary Examiner* — Omkar Deodhar
(74) *Attorney, Agent, or Firm* — Workman Nydegger

(57) ABSTRACT

Disclosed herein is gaming utilizing a first gaming table (3010) and a predefined number of first tokens (3015), wherein said first gaming table (3010) includes a plurality of cells corresponding to said number of first tokens (3015), each cell of said first gaming table being associated with a unique identifier, and further wherein each of said first tokens has an associated value. In an embodiment, populating (1015) said first gaming table by storing each of said first tokens in one of said cells of said first gaming table; iteratively selecting (1020), by a first player, one of said cells of said first gaming table to reveal one of said first tokens stored therein, until each of said first tokens has been revealed; and utilizing said values associated with said first tokens to determine a score for said first player, based on an order in which said first tokens were revealed.

16 Claims, 25 Drawing Sheets

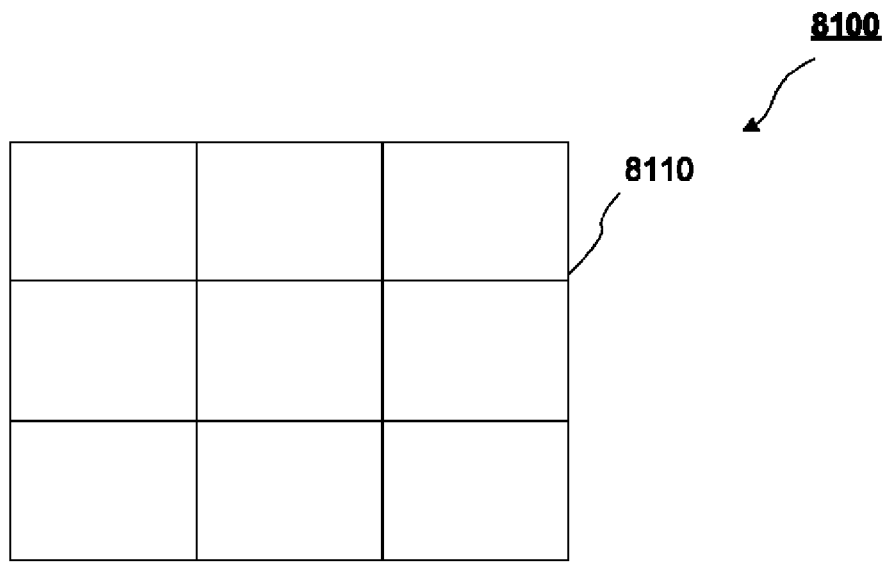
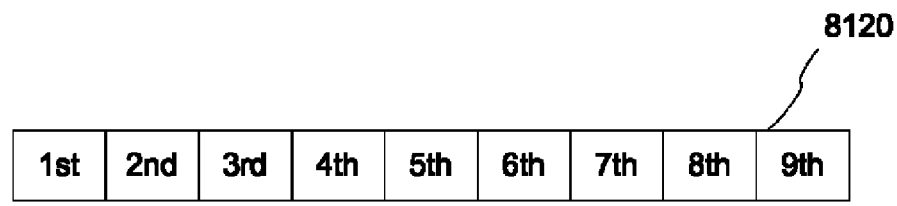
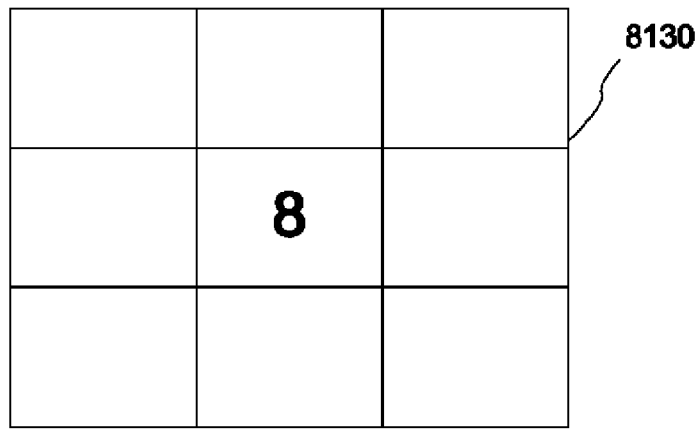
Fig. 8A

10000

| | Turn Number | Value of Revealed Token | ABSOLUTE DIFFERENCE | |
|---|---|---|---|---|
| 1st Token revealed | 1 | 7 | \|1 – 7\| = 6 | 1st Score |
| 2nd Token revealed | 2 | 6 | \|2 – 6\| = 4 | 2nd Score |
| 3rd Token revealed | 3 | 3 | \|3 – 3\| = 0 | 3rd Score |
| 4th Token revealed | 4 | 9 | \|4 – 9\| = 5 | 4th Score |
| 5th Token revealed | 5 | 2 | \|5 – 2\| = 3 | 5th Score |
| 6th Token revealed | 6 | 5 | \|6 – 5\| = 1 | 6th Score |
| 7th Token revealed | 7 | 8 | \|7 – 8\| = 1 | 7th Score |
| 8th Token revealed | 8 | 4 | \|8 – 4\| = 4 | 8th Score |
| 9th Token revealed | 9 | 1 | \|9 – 1\| = 8 | 9th Score |

| | |
|---|---|
| 32 | SUM OF THE SCORES |

| | Predefined Ordered Sequence to Match | Value of Revealed Token | ABSOLUTE DIFFERENCE | |
|---|---|---|---|---|
| 1st Token revealed | 4 | 7 | \|4 – 7\| = 3 | 1st Score |
| 2nd Token revealed | 7 | 6 | \|7 – 6\| = 1 | 2nd Score |
| 3rd Token revealed | 2 | 3 | \|2 – 3\| = 1 | 3rd Score |
| 4th Token revealed | 5 | 9 | \|5 – 9\| = 4 | 4th Score |
| 5th Token revealed | 9 | 2 | \|9 – 2\| = 7 | 5th Score |
| 6th Token revealed | 3 | 5 | \|3 – 5\| = 2 | 6th Score |
| 7th Token revealed | 6 | 8 | \|6 – 8\| = 2 | 7th Score |
| 8th Token revealed | 8 | 4 | \|8 – 4\| = 4 | 8th Score |
| 9th Token revealed | 1 | 1 | \|1 – 1\| = 0 | 9th Score |

| 24 | SUM OF THE SCORES |
|---|---|

| | Sequence to Match | Value of Revealed Token | ABSOLUTE DIFFERENCE | |
|---|---|---|---|---|
| 1st Token revealed | ♈ (Value 500) | ♒ (Value 5500) | \|500 – 5500\| = 5000 | 1st Score |
| 2nd Token revealed | ♉ (Value 1000) | ♏ (Value 4000) | \|1000 – 4000\| = 3000 | 2nd Score |
| 3rd Token revealed | ♊ (Value 1500) | ♈ (Value 500) | \|1500 – 500\| = 1000 | 3rd Score |
| 4th Token revealed | ♋ (Value 2000) | ♌ (Value 2500) | \|2000 – 2500\| = 500 | 4th Score |
| 5th Token revealed | ♌ (Value 2500) | ♊ (Value 1500) | \|2500 – 1500\| = 1000 | 5th Score |
| 6th Token revealed | ♍ (Value 3000) | ♐ (Value 4500) | \|3000 – 4500\| = 1500 | 6th Score |
| 7th Token revealed | ♎ (Value 3500) | ♋ (Value 2000) | \|3500 – 2000\| = 1500 | 7th Score |
| 8th Token revealed | ♏ (Value 4000) | ♑ (Value 5000) | \|4000 – 5000\| = 1000 | 8th Score |
| 9th Token revealed | ♐ (Value 4500) | ♓ (Value 6000) | \|4500 – 6000\| = 1500 | 9th Score |
| 10th Token revealed | ♑ (Value 5000) | ♉ (Value 1000) | \|5000 – 1000\| = 4000 | 10th Score |
| 11th Token revealed | ♒ (Value 5500) | ♍ (Value 3000) | \|5500 – 3000\| = 2500 | 11th Score |
| 12th Token revealed | ♓ (Value 6000) | ♎ (Value 3500) | \|6000 – 3500\| = 2500 | 12th Score |

Fig. 12

25000    SUM OF THE SCORES

GAMING METHOD AND SYSTEM

CROSS-REFERENCE TO RELATED APPLICATIONS

This application is a continuation in part of Australian Patent Application serial no. 2010200417, filed on Feb. 5, 2010 and a continuation in part of PCT Application serial no. PCT/AU2009/001015, filed Aug. 7, 2009 which claims priority to Australian Provisional Patent Application serial no. 2008904616, filed on Sep. 5, 2008, and Australian Provisional Patent Application serial no. 2008904067, filed on Aug. 8, 2008. The contents of each of the above-referenced applications are incorporated by reference herein in its entirety.

TECHNICAL FIELD

The present invention relates generally to entertainment and, in particular, to a gaming method and system.

BACKGROUND

Games of chance, skill, and entertainment exist in many different formats and are played using a variety of different gaming platforms. Such platforms can include, for example, cards, board games, playing fields, and computing devices.

It is desirable for a game to attract a player and retain the attention of the player throughout the duration of the game.

Thus, a need exists to provide an improved gaming method and system.

SUMMARY

It is an object of the present invention to overcome substantially, or at least ameliorate, one or more disadvantages of existing arrangements.

Described herein are a gaming system, method, and computer program product that utilize a first gaming table and a predefined number of tokens. The gaming table includes a number of cells that correspond to the number of tokens and each token has an associated value. The tokens are stored in the cells of the gaming table, with one token in each cell, until all of the cells are populated. A player then selects a cell of the gaming table to reveal the token stored therein. The player continues to select cells of the gaming table to reveal the tokens stored therein, until all of the tokens have been revealed. The gaming system, method, and computer program product of the present disclosure compute a score for a player by utilizing the values associated with the tokens, based on an order in which the tokens were revealed.

In one implementation, the values associated with consecutively revealed tokens are utilized to determine a relative value for each pair of revealed tokens. The relative values for all of the pairs of revealed tokens are summed to obtain a total score for that player. Thus, the gaming system, method, and computer program product of this embodiment compute a score for a player based on the relative difference between values associated with consecutively selected tokens. The gaming system, method, and computer program product may optionally include a starting value to compute an initial score based on a relative difference between the starting value and a first revealed token. The gaming system, method, and computer program product may optionally include a finishing value to compute a finishing score based on a relative difference between the finishing value and a final revealed token. The gaming system, method, and computer program product may optionally both a starting value and a finishing value.

In another implementation, a predefined ordered sequence of values is utilized to determine a score for the player, in conjunction with the order in which the tokens were revealed. The value of each token is compared to a value in the predefined ordered sequence of values corresponding to the order in which that token was revealed to determine a score associated with each revealed token. In one embodiment, the predefined ordered sequence of values corresponds to a number of a turn in which a token is revealed. In another embodiment, the predefined ordered sequence of values is predefined by a competing player, a gaming administrator or operator, or a random number generator.

In one implementation, the gaming system, method, and computer program product of the present disclosure involve game play between two players. Each player populates a gaming table with a set of tokens, wherein the other player is unable to witness how the opposing player has populated their respective gaming table. Thus, a first player populates a first gaming table with a first set of tokens and a second player populates a second gaming table with a second set of tokens. The first player reveals the second set of tokens stored in the gaming table of the second player by iteratively selecting cells of the second gaming table. Similarly, the second player reveals the first set of tokens stored in the first gaming table by iteratively selecting cells of the first gaming table.

The selection of cells by the first player and the second player may occur in an interleaved manner, with the first player and second player taking turns to select a cell from the gaming table of the other player. Alternatively, the first player and second player can each provide a list or sequence of cells in the order in which the tokens are to be stored in their gaming table and provide a list or sequence of cells in the order in which the tokens are to be revealed from the gaming table of the other player.

According to another aspect of the present disclosure, there is provided an apparatus for implementing any one of the aforementioned methods.

According to a further aspect of the present disclosure, there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the present invention will now be described with reference to the drawings, in which:

FIGS. 8A to 8C are schematic block diagram representations of preselection interfaces in accordance with embodiments of the present disclosure;

FIG. 10 is a flow diagram of a method of determining scores for the gaming method and system of the present disclosure;

FIG. 11 is a flow diagram of a method of determining scores for the gaming method and system of the present disclosure;

FIG. 12 is a flow diagram of a method of determining scores for the gaming method and system of the present disclosure;

DETAILED DESCRIPTION OF ILLUSTRATIVE EMBODIMENTS

Figure 1:
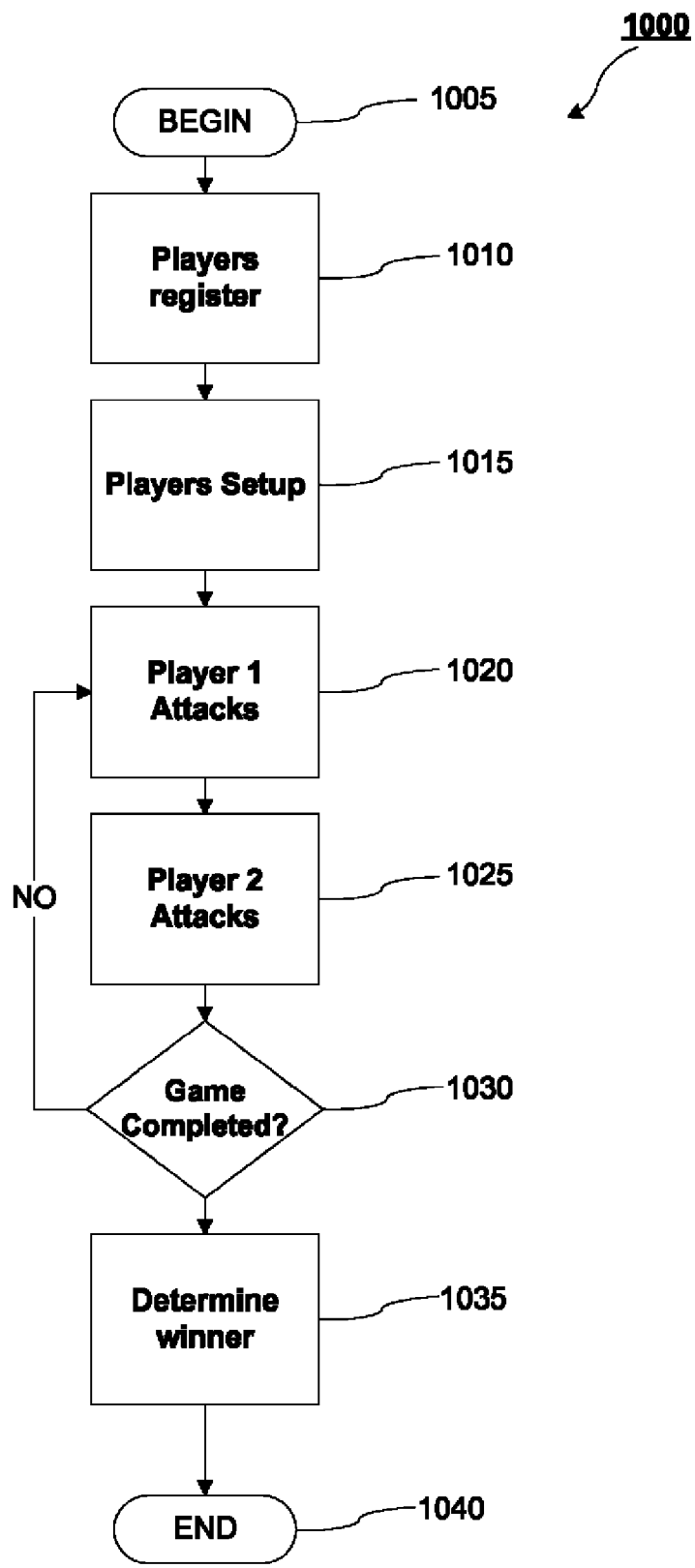
FIG. 1 is a flow diagram of a method of gaming according to an embodiment of the present disclosure.

Where reference is made in any one or more of the accompanying drawings to steps and/or features that have the same reference numerals, those steps and/or features have for the purposes of this description the same function(s) or operation(s), unless the contrary intention appears.

Overview

Disclosed herein is a gaming method and system. According to one embodiment, a plurality of predefined tokens is provided, wherein each token is associated with a value. A gaming table with a corresponding number of gaming cells is also provided, wherein each cell is associated with a unique cell identifier. Each gaming cell is capable of storing one of the tokens.

The gaming table represents an area on which the game is to be played, and can be implemented using, for example, a physical table, a portion of real estate on a display of an electronic device, such as a display screen of a mobile phone handset or computing device, or an area of a proprietary gaming and wagering terminal. Other physical and virtual implementations can equally be practiced without departing from the spirit and scope of the present disclosure.

In one mode of play, each of the tokens is allocated to a corresponding one of the gaming cells and stored therein. The tokens are not initially revealed to a player. The player utilizes the cell identifiers to select one of the gaming cells and the corresponding token stored therein is revealed. The player then selects a second gaming cell to reveal the token stored in the second gaming cell. The game continues until the player has selected all of the gaming cells and all of the tokens have been revealed.

A score is then determined based on the sequence in which the tokens were revealed.

As each token has an associated value, one embodiment determines relative differences between values associated with consecutively selected tokens by calculating an absolute value between successively revealed tokens. The sum of the absolute values is the score awarded to the player for that game; the lower the score, the better.

In one embodiment, a predefined starting value is provided to enable an initial score to be determined, based on a value of the first selected token. The initial score is the absolute value between the starting value and the value of the first selected token. The initial score is included in the sum of the absolute values to determine the score awarded to the player. In a further embodiment, a predefined finishing value is provided to enable a finishing score to be determined, based on a value of the final selected token. The finishing score is the absolute value between the finishing value and the value of the final selected token. The finishing score is included in the sum of the absolute values to determine the score awarded to the player. In another embodiment, a starting value and a finishing value are provided to enable an initial score and a finishing score to be determined in the manner described above. Each of the initial score and the finishing score is included in the sum of the absolute values to determine the score awarded to the player.

An alternative embodiment utilizes a predefined ordered sequence of values to determine the score, based on the sequence in which the tokens were revealed. The method determines a relative difference between values associated with the selected tokens and corresponding values in the predefined ordered sequence of values. The sum of the relative differences is the score awarded to the player for that game; the lower the score, the better. In one embodiment, the predefined ordered sequence of values is a set of numbered turns. In another embodiment, the predefined ordered sequence of values is assigned by a random number generator, a competing player, a game administrator, or other means.

In one embodiment, the tokens are allocated to the gaming cells by a competitor of the player, or a game controller. The game controller can be another person or a program executing on a computing device.

In one embodiment in which the tokens are allocated to the gaming cells by a game controller, thus populating the gaming table with the tokens, a first player and a second player provide a first and second sequence of identifiers, respectively, corresponding to cells of the gaming table. The gaming method determines a first sequence of tokens stored in the gaming table by utilizing the first sequence of identifiers. Similarly, the gaming method determines a second sequence of tokens stored in the gaming table by utilizing the second sequence of identifiers. Determining the first and second sequences may be readily performed, as the identifiers in the first and second sequences of identifiers correspond directly to cells of the gaming table.

The gaming method determines a first score for the first player, based on relative differences between values associated with consecutive tokens in the first sequence of tokens, and determines a second score for the second player, based on relative differences between values associated with consecutive tokens in the second sequence of tokens. The gaming method then determines a winner, based on the first score and the second score. Any number of players can compete in this embodiment by each providing a sequence of identifiers corresponding to cells of the gaming table. A score is determined for each player, as described above, and then a winner is determined.

In another embodiment, an interactive gaming method and system are provided to facilitate the playing of a game between two players. An instance of a game includes three main phases: "setup", "attack", and "scoring". During the "setup" phase, each player populates a gaming table with a sequence of tokens. Thus, a first player and a second player are provided with corresponding first and second gaming tables. Each gaming table includes a number of gaming cells. A first set of tokens is allocated to the first player and a second set of tokens is allocated to the second player. The first and second sets of tokens are identical, and each token in the respective sets is associated with a value. The first player selects a gaming cell on the first gaming table for each one of the tokens in the first set of tokens. Similarly, the second player selects a gaming cell on the second gaming table for each one of the tokens in the second set of tokens. The first gaming table is hidden from the second player and the second gaming table is hidden from the first player while the tokens are being placed.

Once each of the first and second players has populated their respective first and second gaming tables with the respective first and second sets of tokens, the game enters the "attack" phase. During the "attack" phase, the first player and the second player take turns to select a gaming cell from the playing table of the other player. The gaming cells are selected by utilizing unique identifiers associated with each of the cells. When a cell is selected, the token stored therein is revealed to the other player.

The values associated with the predefined tokens form a sequence. It is desirable for a player to reveal tokens in an order that corresponds to the sequence of the values associated with the tokens (or an inversion thereof). The scoring is dependent on the absolute values between successively revealed tokens, and thus the lowest score is achievable by revealing the tokens in the same order as defined by the values associated with the tokens (or in reverse). Calculating absolute values between successively revealed tokens provides a score based on relative differences between values associated with consecutively selected tokens.

Once all of the gaming cells for the first and second gaming tables have been selected and all of the tokens from the first and second sets of tokens have consequently been revealed, the game passes to the "scoring" phase. The "scoring" phase calculates the absolute values between the tokens in the order in which the tokens were revealed and then the absolute values are added to provide a total. The player with the lower total is the winner. If the totals are the same, it is a draw.

The tokens can be numbers, icons, pictures, or any graphical symbol. The tokens are arranged in a sequential order by virtue of the values associated with the tokens. It is desirable to identify the tokens in the same sequential order, or the reverse thereof, to minimize the score.

In an alternative embodiment, the "attack" phase and the "scoring" phase occur in parallel, such that one or more interim scores are provided to the players during the attack phase. In one implementation, the "attack" phase and the "scoring" phase are interleaved to provide each player with a progress score after each token has been revealed. Such an embodiment provides the players with immediate feedback relating to their progress in the game.

In one implementation, the players are informed only of their respective score. In another implementation, the scores of the first and second players are provided to each of the first and second players, and thus both first and second players will have an indication of their performance relative to the other player, and thus will have an indication of their relative chances of success.

A further embodiment provides information to the players at one or more intervals during play of the game. The information is based on the sequence of tokens chosen to that time and may include, for example, one or more of: a player's current score, a maximum possible score for that player based on the remaining tokens, a minimum possible score for that player based on the remaining tokens, a range of possible scores for that player based on the remaining tokens, an opponent's score, a maximum possible score for the opponent based on the remaining tokens, a minimum possible score for the opponent based on the remaining tokens, a range of possible scores for the opponent based on the remaining tokens, a probability of the player winning based on the current position of the game, and a probability of the opponent winning based on the current position of the game. The players can then utilize the information to make decisions relating to further bets and stakes that may be wagered on the game.

One embodiment of the present disclosure provides each of first and second players with a gaming table in the form of a 3×3 grid upon which the first and second players have to place the numbers 1 (one) through to 9 (nine) in any cell within the gaming table without the other player knowing where they have placed their numbers on their gaming table. Once a player has completed placing the numbers on the gaming table, that player must wait until their opponent has also setup their gaming table. Once both players have prepared their respective gaming tables (placed the numbers 1 through to 9 within each cell in the game), the game is ready to begin.

One player will make the first guess at identifying a number on the opposing player's gaming table. The player will select a cell, using a unique identifier associated with the cell, and the opponent will reveal what number they had placed in the selected cell. The player will then record the revealed number on his score sheet. As there are 9 numbers stored in the 9 cells of the 3×3 grid of the gaming table, each player will have 9 attacking attempts to identify where the numbers are located on their competitor's gaming table. The attacking attempts and their order define an "attack sequence".

The idea of the game is that the opposing player will attempt to guess where the player has placed their numbers and with each attempt identify a sequence. The goal of the game is to guess where each number is and, with every attempt, guess a low scoring sequence. The total score is determined by determining relative differences between values associated with consecutively selected first tokens and then adding each of the absolute differences between each score sequence. In this particular example, the lowest scoring sequences are 1,2,3,4,5,6,7,8,9 and 9,8,7,6,5,4,3,2,1. The player with the lowest score wins the game. The lowest possible score for this embodiment is 8.

For example, if the first player selects the cells in the order in which those cells contain the numbers 1 to 9, the revealed sequence is 1, 2, 3, 4, 5, 6, 7, 8, 9. The scoring is set out below:

| Score Sequence achieved | {1, 2, 3, 4, 5, 6, 7, 8, 9} |
|---|---|
| Score 1&2 | 1-2 = \|-1\| = 1 |
| Score 2&3 | 2-3 = \|-1\| = 1 |
| Score 3&4 | 3-4 = \|-1\| = 1 |
| Score 4&5 | 4-5 = \|-1\| = 1 |
| Score 5&6 | 5-6 = \|-1\| = 1 |
| Score 6&7 | 6-7 = \|-1\| = 1 |
| Score 7&8 | 7-8 = \|-1\| = 1 |
| Score 8&9 | 8-9 = \|-1\| = 1 |
| Total Score | 1 + 1 + 1 + 1 + 1 + 1 + 1 + 1 = 8 |

If the first and second player attain the same Total Score, it is a draw. Draws can be handled in many different ways. For example, another complete or partial game can be played, the prize can be split, or a bonus round can be instigated. Such a bonus round may include, for example:

i. BLACK/RED. Each player must select a color from a color range. Each player must then guess what the other player has selected. The player that guesses correctly in a single iteration of the BLACK/RED round wins the game.

ii. Pick the number. Each player must select a number from a predefined number range. The player who guesses the other player's number in a round of pick the number wins. If both players guess the respective number in the first round then another round of "Pick the number" must be played.

iii. Closest guess. Each player must select a number from a predefined number range. Each opponent has to guess what number their opponent picked. The player that guesses the number which is the closest in value to the other participant's chosen number, wins.

iv. Random number generator. A winner is allocated by a random number generator executing on a processor of a computing device.

v. Best Player. A winner is identified as the player whose total score was lower to the other player in a prior score sequence before the draw occurred. The prior score sequence can include all scores determined before the draw occurred or any subset thereof.

vi. Best Last Play. A winner is identified as the player who scored the lowest score in a previous score sequence(s). The previous score sequence can include a score derived from a most recent pair of tokens, or a score derived from any sequence of revealed tokens before the draw occurred.

vii. Replay. A new game is played due to the draw occurring.

viii. Share Prize. The players share the WIN outcome.

ix. Lowest Number First. The player who revealed the lowest number(s) first is determined as the winner, the lowest number corresponding to the lowest value associated with one of the tokens.

x. Highest Number First. The player who revealed the highest number(s) first is determined as the winner, the highest number corresponding to the highest value associated with one of the tokens.

Other embodiments utilize a gaming table having a 2×2 grid of cells with a sequence of tokens from 1 to 4, a gaming table having a 4×4 grid of cells with a sequence of tokens from 1 to 16, a gaming table having a 5×5 grid of cells with a sequence of tokens from 1 to 25, and so forth. Yet other embodiments utilize gaming tables with cells not arranged in a grid formation. For example, the cells can be placed in one or more lines, the cells can be arranged to form a picture or geometric representation, or the cells can be placed randomly within the gaming table. As long as the cells are associated with unique identifiers, any number of cells can be utilized in any desired arrangement.

FIG. 1 is a flow diagram of a process 1000 for playing a game in accordance with one embodiment of the present disclosure. In this embodiment, the predefined tokens are the numbers 1, 2, 3, 4, 5, 6, 7, 8, 9 and the value associated with each token is the number itself. Thus, 1 has a value of 1, 2 has a value of 2, 3 has a value of 3, 4 has a value of 4, 5 has a value of 5, 6 has a value of 6, 7 has a value of 7, 8 has a value of 8, and 9 has a value of 9. The sequences 1, 2, 3, 4, 5, 6, 7, 8, 9 and 9, 8, 7, 6, 5, 4, 3, 2, 1 will produce a lowest possible sum of "8" for the absolute values of successive tokens. In this embodiment, a gaming table consisting of 9 cells arranged in a 3×3 grid is provided to each of a first and a second player.

The gaming process 1000 commences at a Begin step 1005 and progresses to step 1010, in which the first and second players register to play an instance of the game. The actual step of registration will depend on the platform on which the game is being played. In a board game environment, registration may include collecting tokens and a gaming table. In a mobile telephone environment, selecting a gaming application on a mobile handset may register the user with a remote gaming server via a communications network. Optionally, depending on the application, a user may be required to transfer personal information. In an ad-hoc wireless network environment, such as Bluetooth, the establishment of an ad-hoc wireless connection may constitute the registration. In an online computing environment, registration may include the steps of browsing a website and providing personal information.

Control passes to step 1015, in which the first and second players set up a respective gaming table by placing each of the tokens 1 to 9 in a cell of the 3×3 grid. The aim of the game is to identify the locations of a competing player's sequence of numbers on a corresponding gaming table.

In step 1020, the first player attacks by selecting a first cell in the 3×3 grid of the gaming table of the second player. The first player is free to choose any cell, and selects the cell by using unique identifiers associated with each of the cells. In one embodiment, the columns of the 3×3 grid of the gaming table are allocated "A", "B", "C", respectively, and the rows "1", "2", "3", respectively, as identifiers. Thus, the top left cell is designated A1 and the bottom-right cell is designated C3. The token stored in the selected cell is then revealed to the first player.

Control passes to step 1025 and the second player attacks by selecting a cell of the gaming table of the first player. The token stored in the selected cell is then revealed to the second player. Control passes to decision step 1030, which determines whether the game has completed. If the game has not completed, No, control returns to step 1020 and the first player attacks again. However, if at step 1030 the game has completed, Yes, control passes to step 1035. Step 1035 determines a winner based on scores derived during the gaming process. Values associated with each token are utilized to determine a score for the sequence in which the tokens were revealed by each of the first player and the second player. Control then passes to step 1040 and the process 1000 terminates.

As described above, it is possible for the "attack" phase and the "scoring" phase to run in parallel. In such an embodiment, scores are calculated after each token is revealed by an "attacking" move, and thus the winner is readily determined once all tokens have been revealed.

The example of FIG. 1 will now be described in greater detail with reference to FIG. 2, FIG. 3, and FIG. 4. A finite sequence of tokens 1, 2, 3, 4, 5, 6, 7, 8, 9 is to be utilized by each of the first player and the second player. As described above with reference to FIG. 1, the gaming table for this example includes 9 cells arranged in a 3×3 grid. FIG. 3 shows a gaming system 3000 with a gaming table 3010 with columns denoted "A", "B", and "C" and rows denoted "1", "2", and "3". The gaming system 3000 also includes an array 3015 of the sequence of tokens "1, 2, 3, 4, 5, 6, 7, 8, 9".

FIGS. 2A to 2H show a flow diagram explaining the steps of FIG. 1 in more detail. A gaming process 2000 begins at a begin step 2002 of FIG. 2A and proceeds to a player registration step 2004. Control passes to step 2006, in which the first player prepares the first gaming table by placing each of the tokens 1 to 9 in cells of the first player's choosing. Control passes to 2008 and the second player prepares the second gaming table by placing each of the tokens 1 to 9 in the cells of the second player's choosing. At this stage, the tokens placed by the second player in the cells of the second gaming table are not visible to the first player and the tokens placed by the first player in the first gaming table are not visible to the second player. It will be appreciated that steps 2006 and 2008 can be reversed or performed in parallel, without departing from the spirit and scope of the present disclosure.

In this example, the gaming table 3010 of FIG. 3 represents the second gaming table. Arrows from the array 3015 to the gaming table 3010 indicate the manner in which the second player has populated the gaming table in this example. Thus, cell A1 contains "2", cell B1 contains "8", cell C1 contains "6", cell A2 contains "7", cell B2 contains "1", cell C2 contains "9", cell A3 contains "4", cell B3 contains "3", and cell C3 contains "5".

Figure 4:
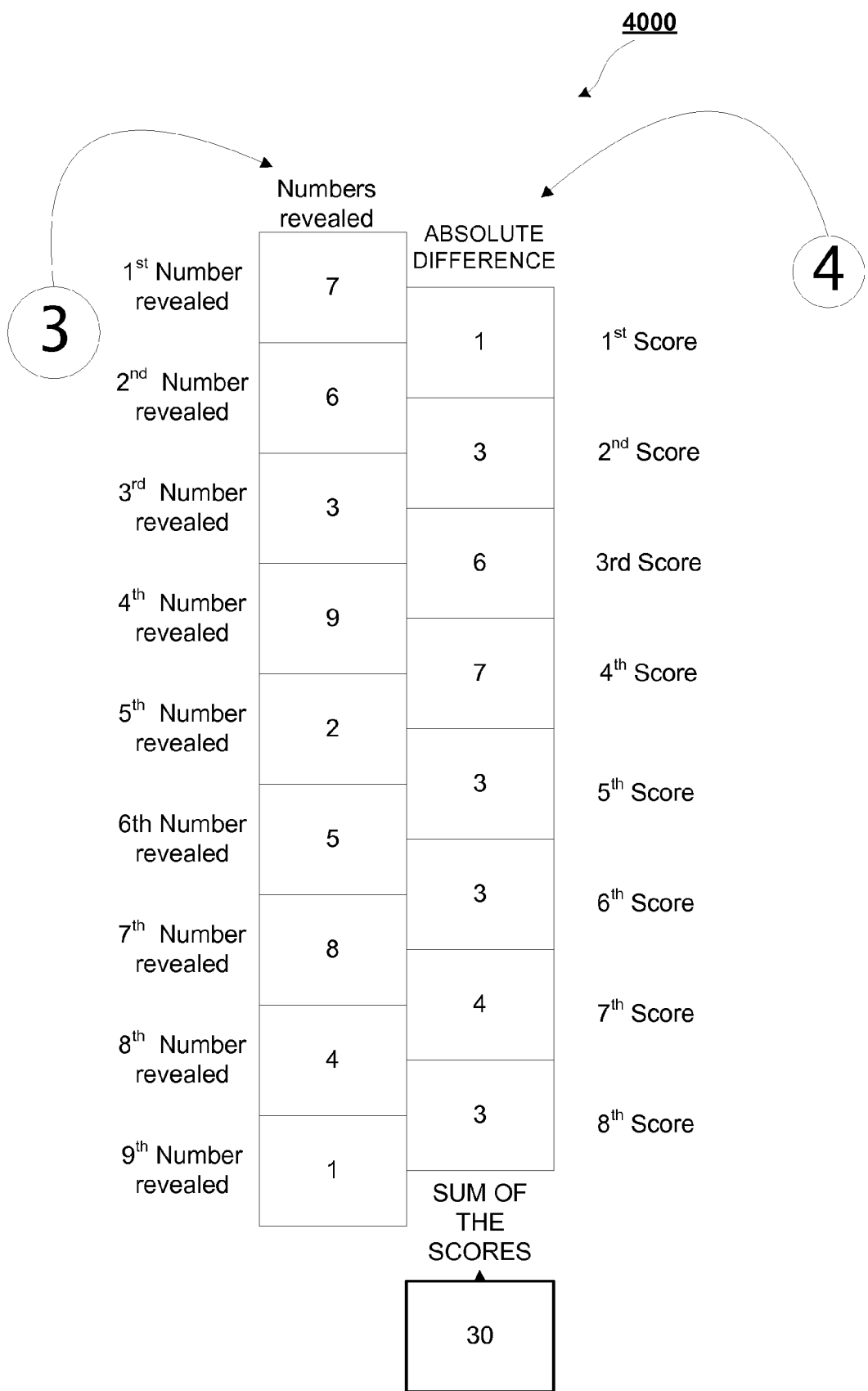
FIG. 4 is a flow diagram of a method of determining scores for the gaming method and system of FIGS. 1 to 3.

FIG. 4 is an example of a scoring sheet 4000 that can be utilized to track scores during an instance of a game. The scoring sheet 4000 shows a first column consisting of 9 cells into which tokens revealed during game play can be placed. The scoring sheet 4000 also shows a second column next to the first column. The second column consists of 8 cells, wherein the second column is displaced relative to the first column, such that each cell of the second column straddles two cells from the first column. The cells of the second column are for storing the absolute values of the tokens stored in the adjacent cells of the first column. For the sake of brevity and clarity, the first gaming table and scoring chart for the second player are not shown.

Once the first player and second player have prepared their respective first and second gaming tables, control passes from step 2008 to 2010, in which the first player makes a first attacking attempt by choosing a cell on the grid of the second playing table. In step 2012, the token placed in the selected cell is revealed to the first player. If the first player selects cell A2, the token "7" is revealed to the first player. For scoring purposes, "7" is placed in the first cell of the first column of FIG. 4. In this example, the tokens and their associated values are the same. In alternative embodiments, the value associated with the revealed token is utilized for scoring purposes.

Control passes to step 2014 for the first attempt of the second player. The second player chooses a cell on the grid of the first playing table and control passes to step 2016 of FIG. 2B in which the token placed in the selected cell is revealed to the second player.

Control passes from step 2016 to 2018, in which the first player makes a second attacking attempt by choosing a second cell on the grid of the second playing table. In step 2020, the token placed in the selected cell is revealed to the first player. The first player knows that the first token revealed was "7" and that the smallest score will be achieved by selecting the cell in which the second player placed either the "6" or the "8", as the absolute difference between "7" and "6" is 1 and the absolute difference between "7" and "8" is 1.

If the first player selects cell C1, the token "6" is revealed to the first player. The token "6" is placed in the second cell of the first column of FIG. 4. Control passes to step 2022, which determines a first score for the first player by calculating the absolute value of the difference between the values associated with the tokens revealed by the first and second attempts of the first player. The first score is the relative difference between the values associated with the tokens revealed by the first and second attempts of the first player. In this example, the first and second attempts revealed tokens "7" and "6", which have an absolute difference of 1. Thus, the first score of the first player is 1. This first score is entered in the first cell of the second column of FIG. 4.

Control passes to step 2024 for the second attempt of the second player. The second player chooses a second cell on the grid of the first playing table and control passes to step 2026 in which the token placed in the selected cell is revealed to the second player. Control then passes to step 2028 to determine a first score of the second player.

Figure 2A:
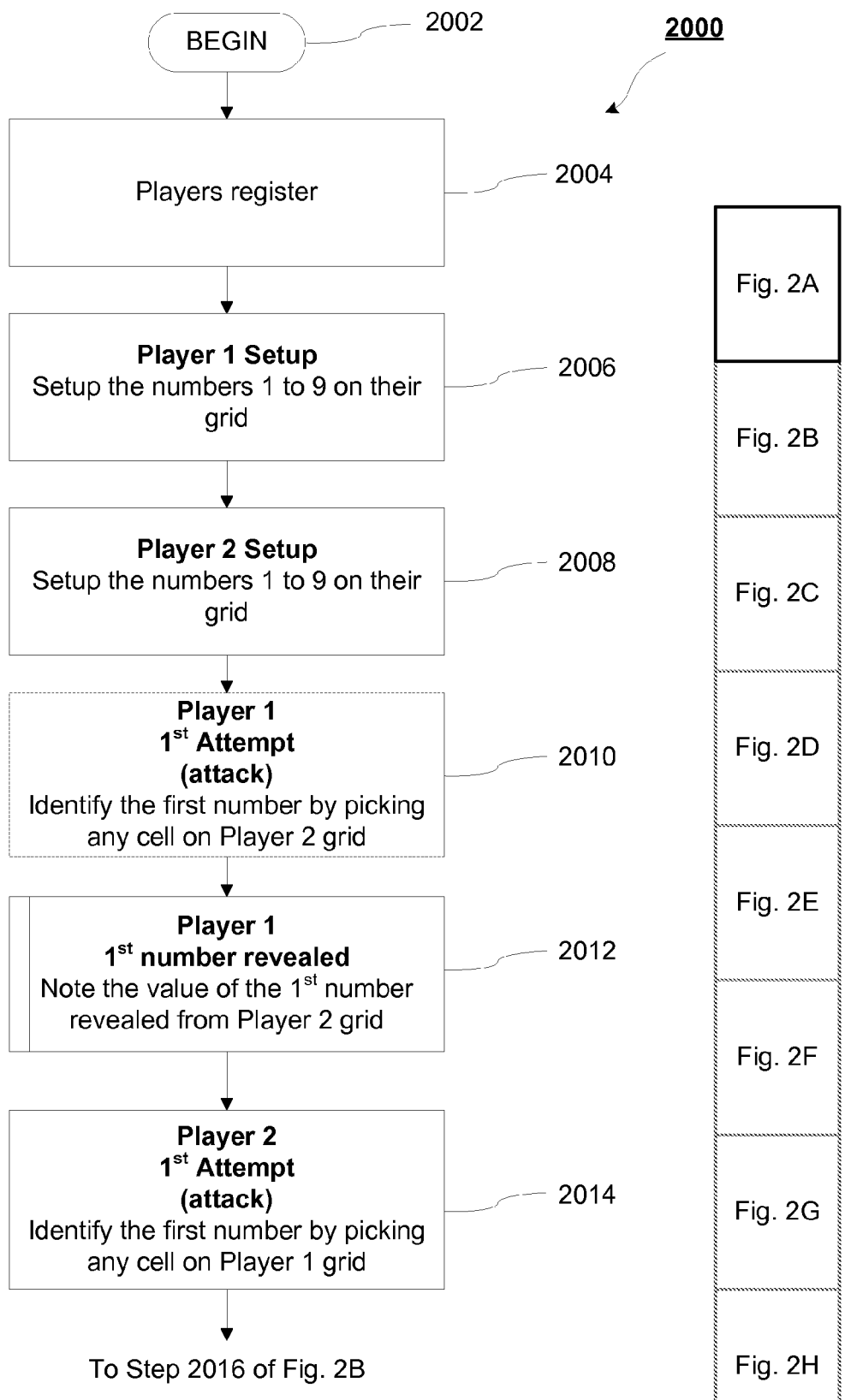
FIGS. 2A to 2H are a flow diagram of a method of gaming according to an embodiment of the present disclosure.
Figure 2B:
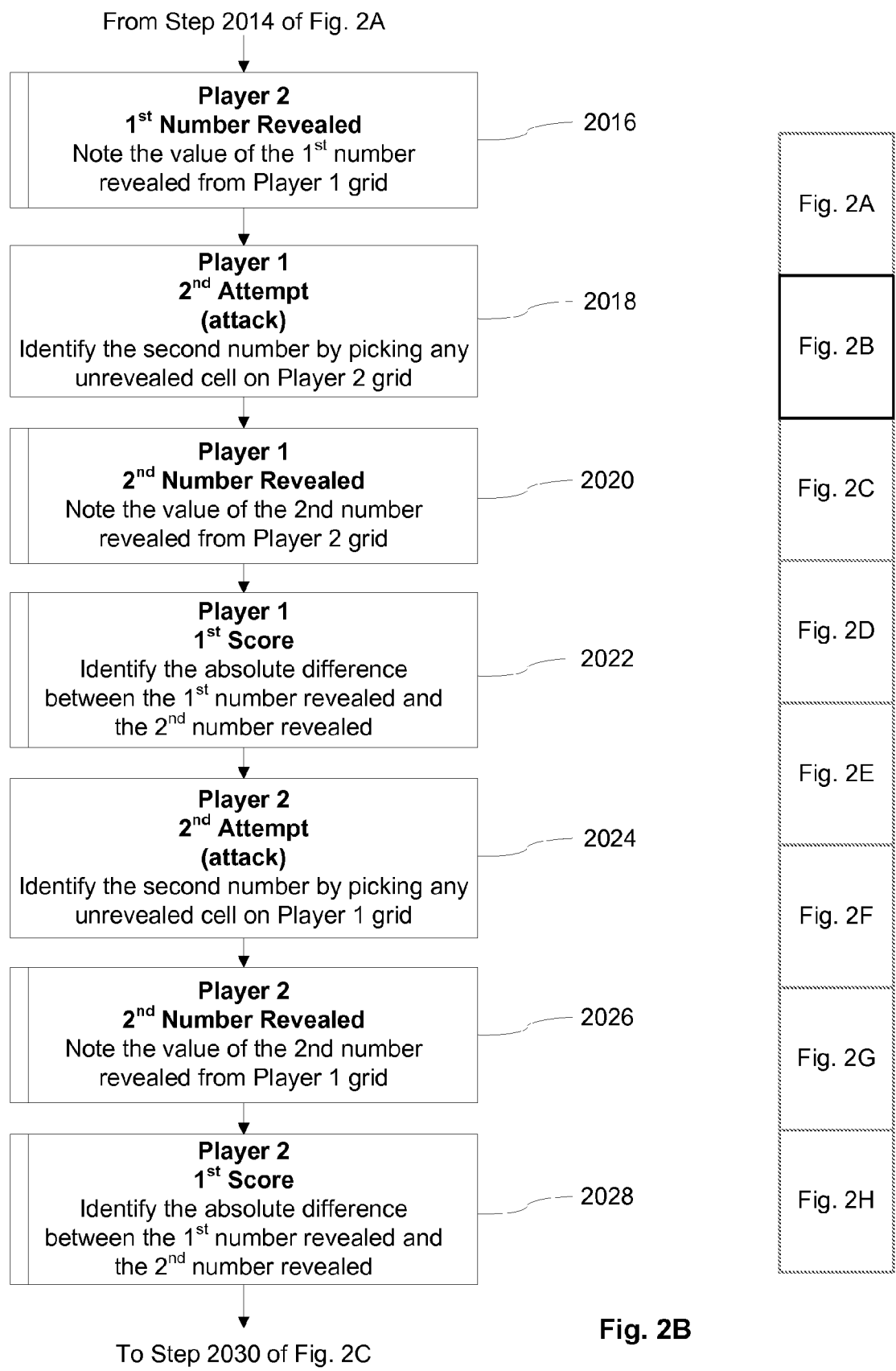
Figure 2C:
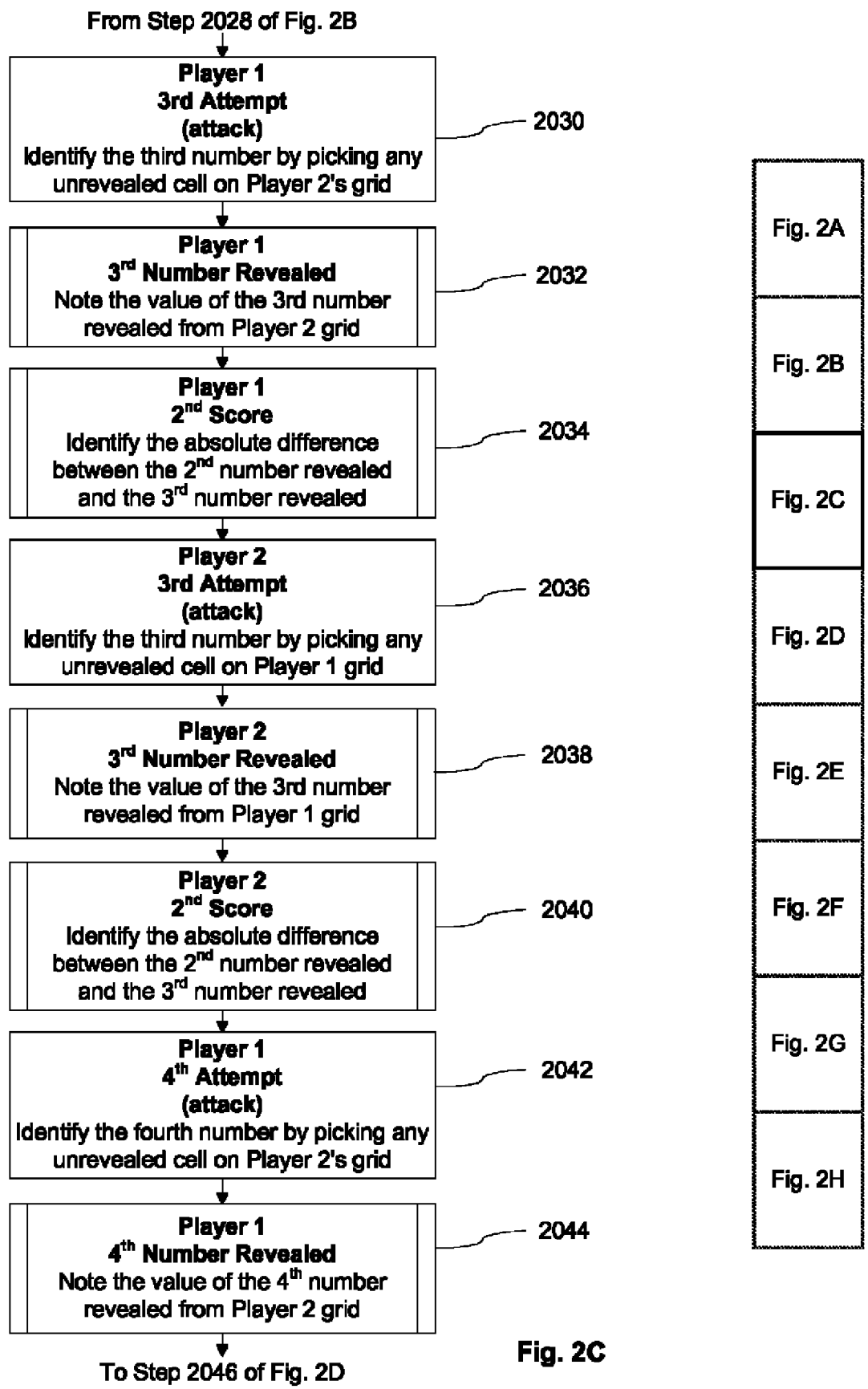
Figure 2D:
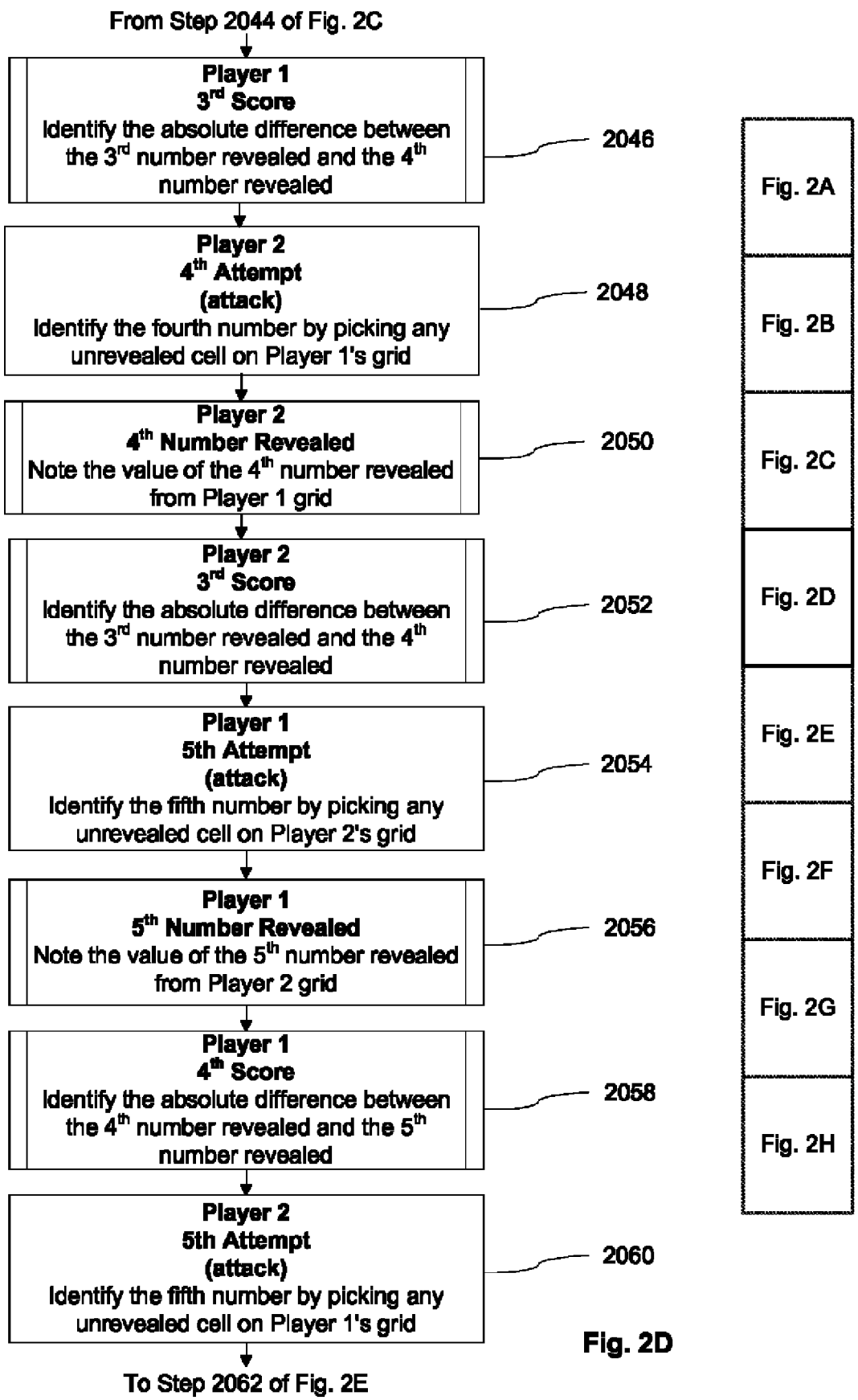
Figure 2E:
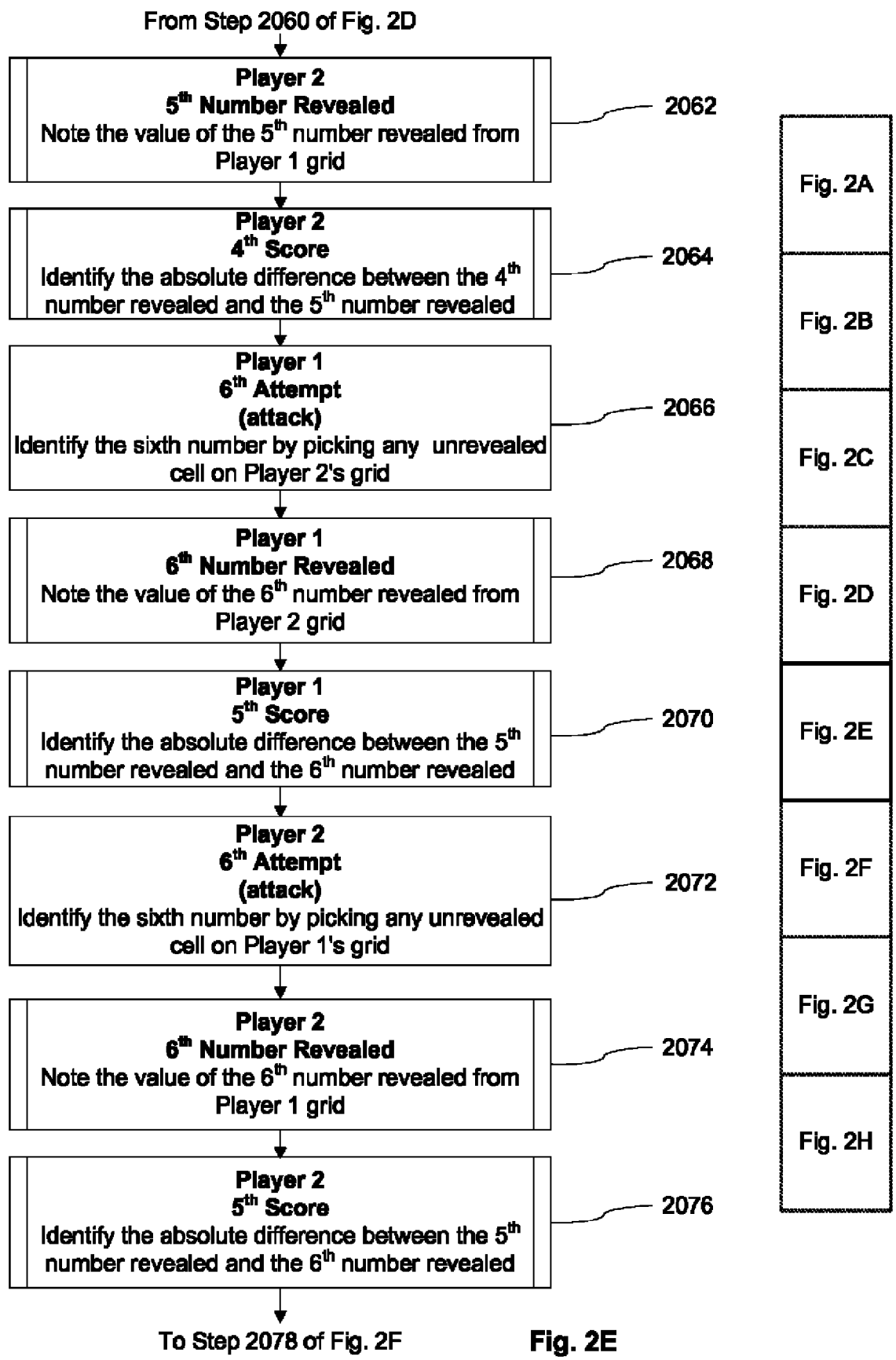
Figure 3:
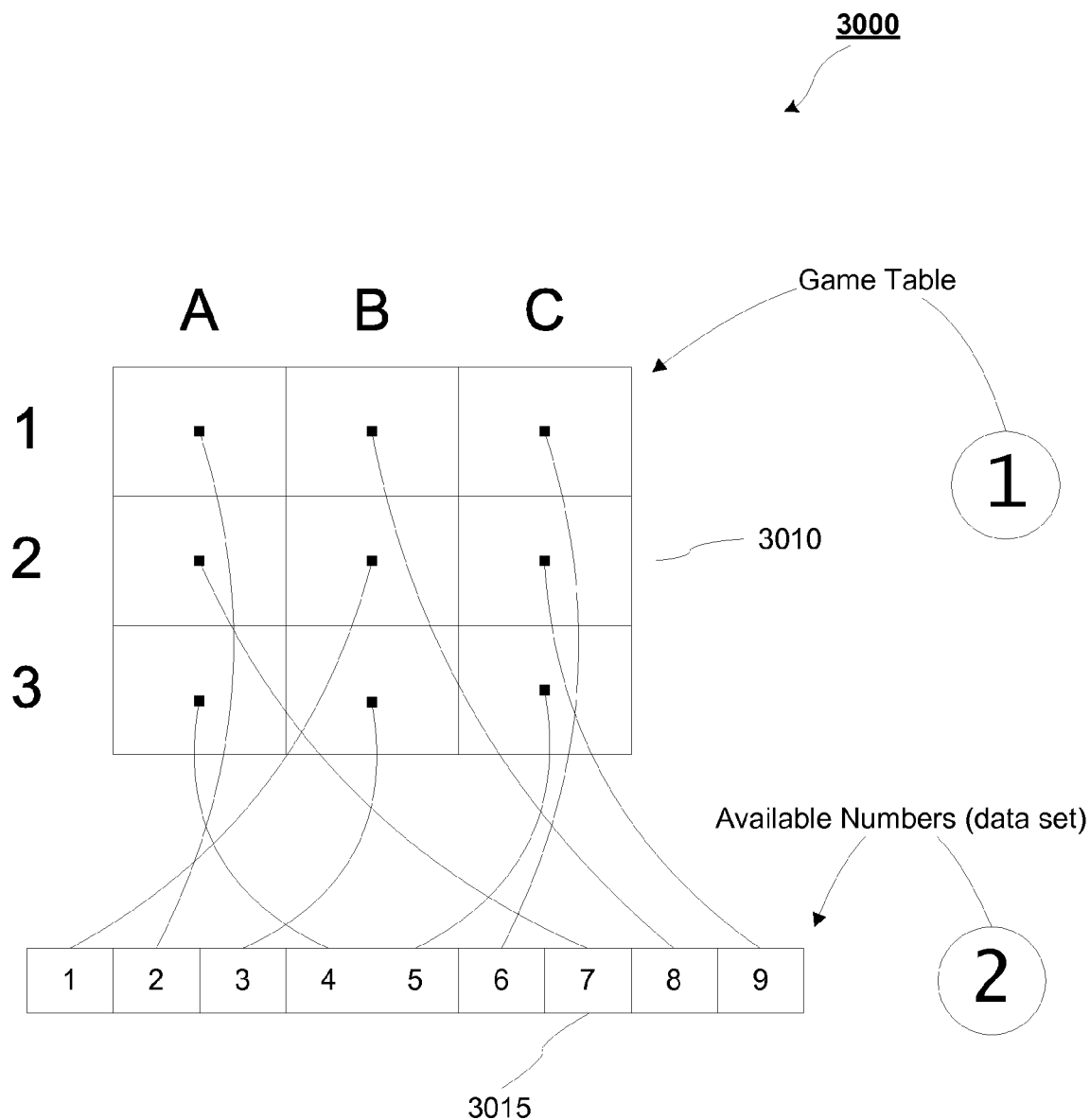
FIG. 3 is a schematic representation of a gaming method and system according to an embodiment of the present disclosure.

Control passes from step 2028 to 2030 of FIG. 2C, in which the first player makes a third attacking attempt by choosing a third cell on the grid of the second playing table. In step 2032, the token placed in the selected cell is revealed to the first player. The first player knows that the most recently revealed token was "6" and that the smallest score will be achieved by selecting the cell in which the second player placed the "5", as the absolute difference between "7" and "6" is 1. Token "7" was selected in the first attacking attempt.

If the first player selects cell B3, the token "3" is revealed to the first player. The token "3" is placed in the third cell of the first column of FIG. 4. Control passes to step 2034, which determines a second score for the first player by calculating the absolute value of the difference between the values associated with the tokens revealed by the second and third attempts of the first player. In this example, the second and third attempts revealed tokens "6" and "3", which have an absolute difference of 3. Thus, the second score of the first player is 3. This second score is entered in the second cell of the second column of FIG. 4.

Control passes to step 2036 for the third attempt of the second player. The second player chooses a third cell on the grid of the first playing table and control passes to step 2038 in which the token placed in the selected cell is revealed to the second player. Control then passes to step 2040 to determine a second score of the second player.

Control passes from step 2040 to 2042, in which the first player makes a fourth attacking attempt by choosing a fourth cell on the grid of the second playing table. In step 2044, the token placed in the selected cell is revealed to the first player. The first player knows that the most recently revealed token was "3" and that the smallest score will be achieved by selecting the cell in which the second player placed either the "2" or the "4", as the absolute difference between "3" and "2" is 1 and the absolute difference between "3" and "4" is 1.

If the first player selects cell C2, the token "9" is revealed to the first player. The token "9" is placed in the second cell of the first column of FIG. 4. Control passes to step 2046 of FIG. 2D, which determines a third score for the first player by calculating the absolute value of the difference between the values associated with the tokens revealed by the third and fourth attempts of the first player. In this example, the third and fourth attempts revealed tokens "3" and "9", which have an absolute difference of 6. Thus, the third score of the first player is 6. This third score is entered in the third cell of the second column of FIG. 4.

Control passes to step 2048 for the fourth attempt of the second player. The second player chooses a fourth cell on the grid of the first playing table and control passes to step 2050 in which the token placed in the selected cell is revealed to the second player. Control then passes to step 2052 to determine a third score of the second player.

Control passes from step 2052 to 2054, in which the first player makes a fifth attacking attempt by choosing a fifth cell on the grid of the second playing table. In step 2056, the token placed in the selected cell is revealed to the first player. The first player knows that the most recently revealed token was "9" and that the smallest score will be achieved by selecting the cell in which the second player placed the "8", as the absolute difference between "9 " and "8" is 1.

If the first player selects cell A1, the token "2" is revealed to the first player. The token "2" is placed in the fifth cell of the first column of FIG. 4. Control passes to step 2058, which determines a fourth score for the first player by calculating the absolute value of the difference between the values associated with the tokens revealed by the fourth and fifth attempts of the first player. In this example, the fourth and fifth attempts revealed tokens "9 and "2", which have an absolute difference of 7. Thus, the fourth score of the first player is 7. This fourth score is entered in the fourth cell of the second column of FIG. 4.

Control passes to step 2060 for the fifth attempt of the second player. The second player chooses a fifth cell on the grid of the first playing table and control passes to step 2062 of FIG. 2E in which the token placed in the selected cell is revealed to the second player. Control then passes to step 2064 to determine a fourth score of the second player.

Control passes from step 2064 to 2066, in which the first player makes a sixth attacking attempt by choosing a sixth cell on the grid of the second playing table. In step 2068, the token placed in the selected cell is revealed to the first player. The first player knows that the most recently revealed token was "2" and that the smallest score will be achieved by selecting the cell in which the second player placed either the "1" or the "3", as the absolute difference between "2" and "1" is 1 and the absolute difference between "2" and "3" is 1.

If the first player selects cell C3, the token "5" is revealed to the first player. The token "5" is placed in the sixth cell of the first column of FIG. 4. Control passes to step 2070, which determines a fifth score for the first player by calculating the absolute value of the difference between the values associated with the tokens revealed by the fifth and sixth attempts of the first player. In this example, the fifth and sixth attempts revealed tokens "2" and "5", which have an absolute difference of 3. Thus, the fifth score of the first player is 3. This fifth score is entered in the fifth cell of the second column of FIG. 4.

Control passes to step 2072 for the sixth attempt of the second player. The second player chooses a sixth cell on the grid of the first playing table and control passes to step 2074 in which the token placed in the selected cell is revealed to the second player. Control then passes to step 2076 to determine a fifth score of the second player.

Figure 2F:
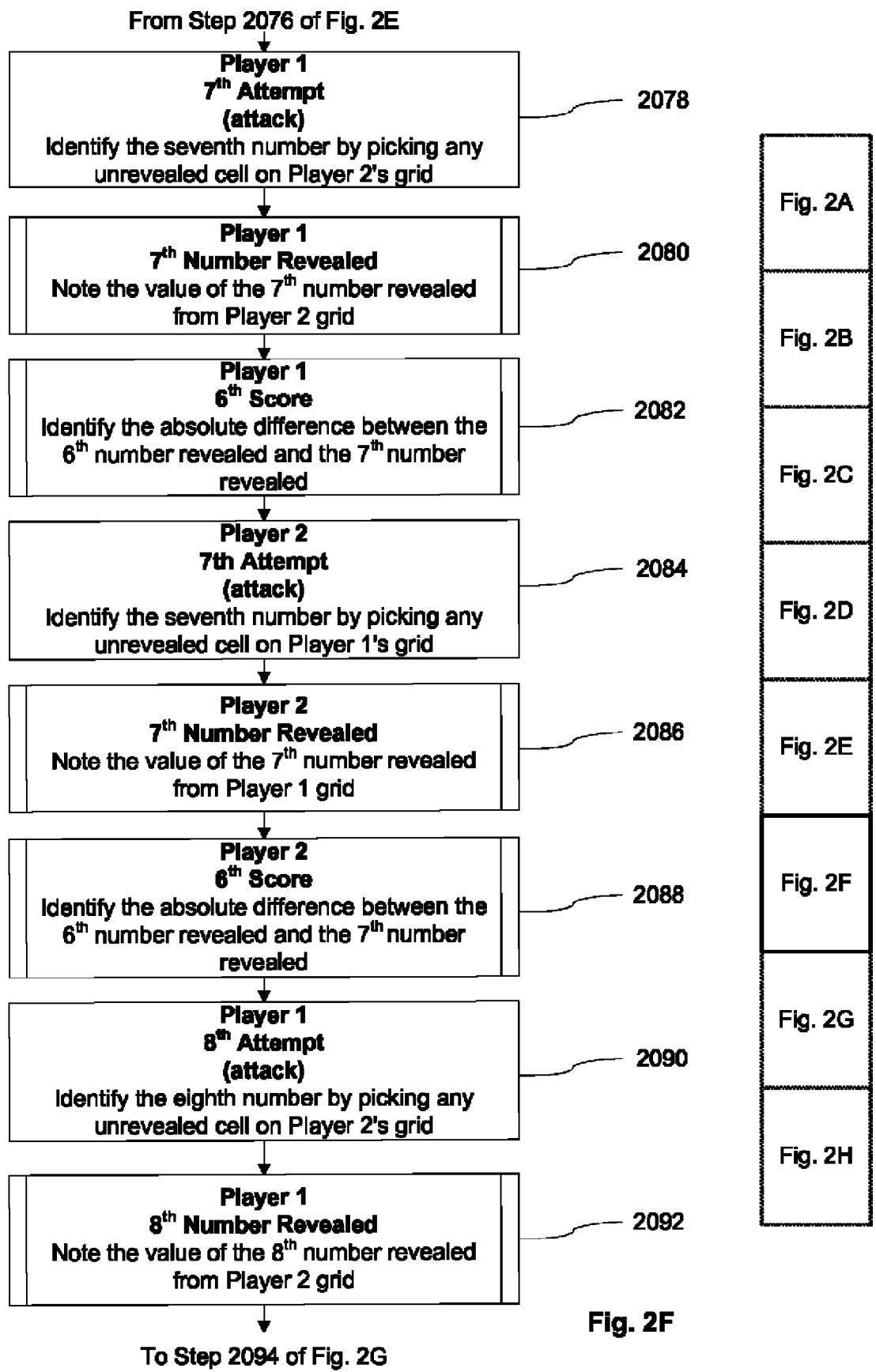
Figure 2G:
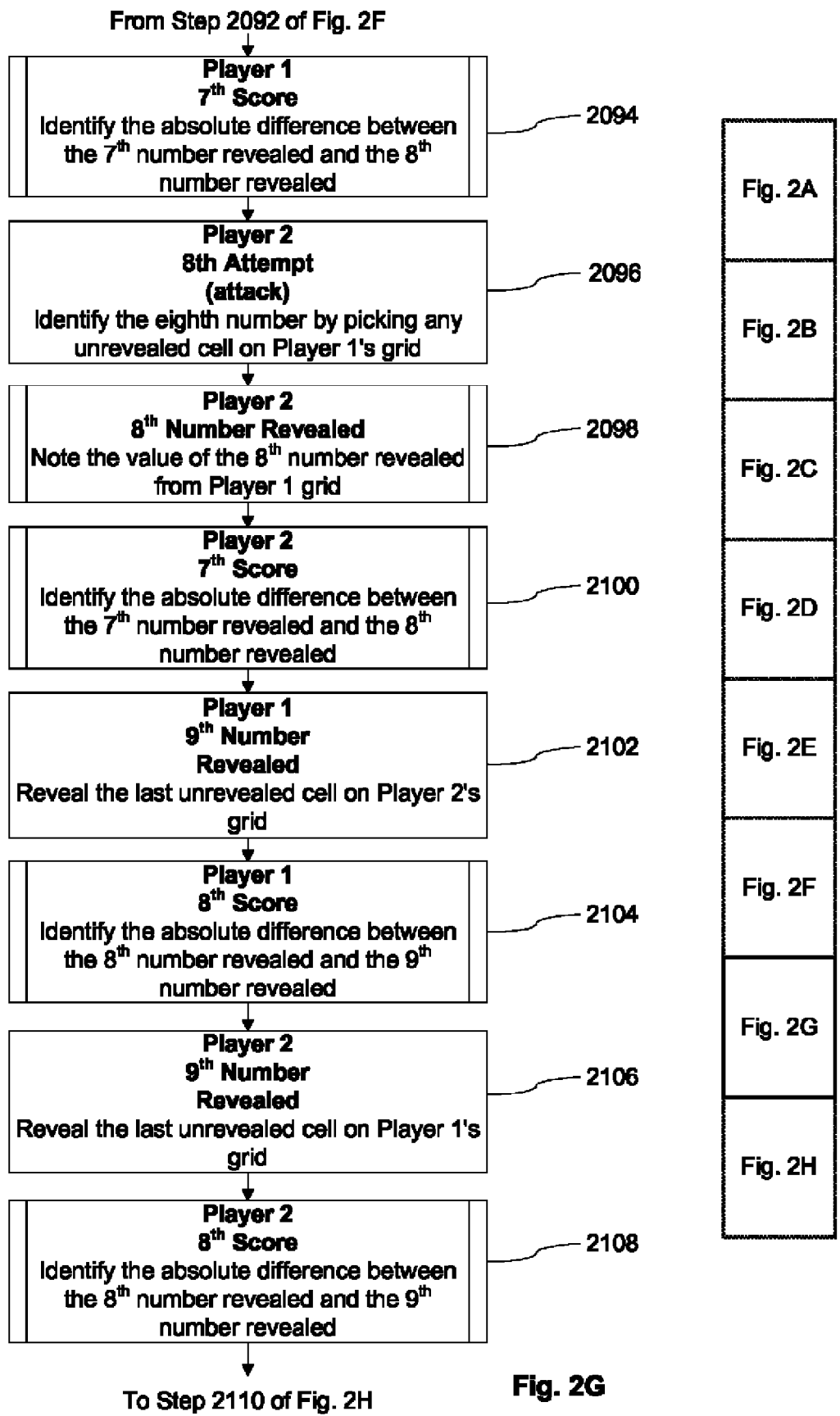

Control passes from step 2076 to 2078 of FIG. 2F, in which the first player makes a seventh attacking attempt by choosing a seventh cell on the grid of the second playing table. In step 2080, the token placed in the selected cell is revealed to the first player. The first player knows that the most recently revealed token was "5" and that the smallest score will be achieved by selecting the cell in which the second player placed the "4".

If the first player selects cell B1, the token "8" is revealed to the first player. The token "8" is placed in the seventh cell of the first column of FIG. 4. Control passes to step 2082, which determines a sixth score for the first player by calculating the absolute value of the difference between the values associated with the tokens revealed by the sixth and seventh attempts of the first player. In this example, the sixth and seventh attempts revealed tokens "5" and "8", which have an absolute difference of 3. Thus, the sixth score of the first player is 3. This sixth score is entered in the sixth cell of the second column of FIG. 4.

Control passes to step 2084 for the seventh attempt of the second player. The second player chooses a seventh cell on the grid of the first playing table and control passes to step 2086 in which the token placed in the selected cell is revealed to the second player. Control then passes to step 2088 to determine a first score of the second player.

Control passes from step 2088 to 2090, in which the first player makes an eighth attacking attempt by choosing an eighth cell on the grid of the second playing table. In step 2092, the token placed in the selected cell is revealed to the first player. The first player knows that the most recently revealed token was "8" and that the remaining tokens are 1 and 4. Thus, the smallest score for this attempt will be achieved by selecting the cell in which the second player placed either the "4".

If the first player selects cell A3, the token "4" is revealed to the first player. The token "4" is placed in the second cell of the first column of FIG. 4. Control passes to step 2094 of FIG. 2G, which determines a seventh score for the first player by calculating the absolute value of the difference between the values associated with the tokens revealed by the sixth and seventh attempts of the first player. In this example, the sixth and seventh attempts revealed tokens "8 and "4", which have an absolute difference of 4. Thus, the seventh score of the first player is 4. This seventh score is entered in the seventh cell of the second column of FIG. 4.

Control passes to step 2096 for the eighth attempt of the second player. The second player chooses an eighth cell on the grid of the first playing table and control passes to step 2098 in which the token placed in the selected cell is revealed to the second player. Control then passes to step 2100 to determine a seventh score of the second player.

Control passes from step 2100 to 2102, in which the token placed in the ninth and remaining cell on the grid of the second playing table is revealed to the first player. As there is only one cell remaining, there is no input required from the first player. The remaining cell is B1 and the token "1" is revealed. "1" is placed in the ninth cell of the first column of FIG. 4. Control passes to step 2104, which determines an eighth score for the first player by calculating the absolute value of the difference between the values associated with the tokens revealed by the eighth and ninth attempts of the first player. In this example, the eighth and ninth attempts revealed tokens "4" and "1", which have an absolute difference of 3. Thus, the ninth score of the first player is 3. This eighth score is entered in the eighth cell of the second column of FIG. 4.

Control passes to step 2106 in which the token placed in the ninth and remaining cell on the grid of the gaming table of the first player is revealed to the second player. Control then passes to step 2108 to determine an eighth score of the second player.

Figure 2H:
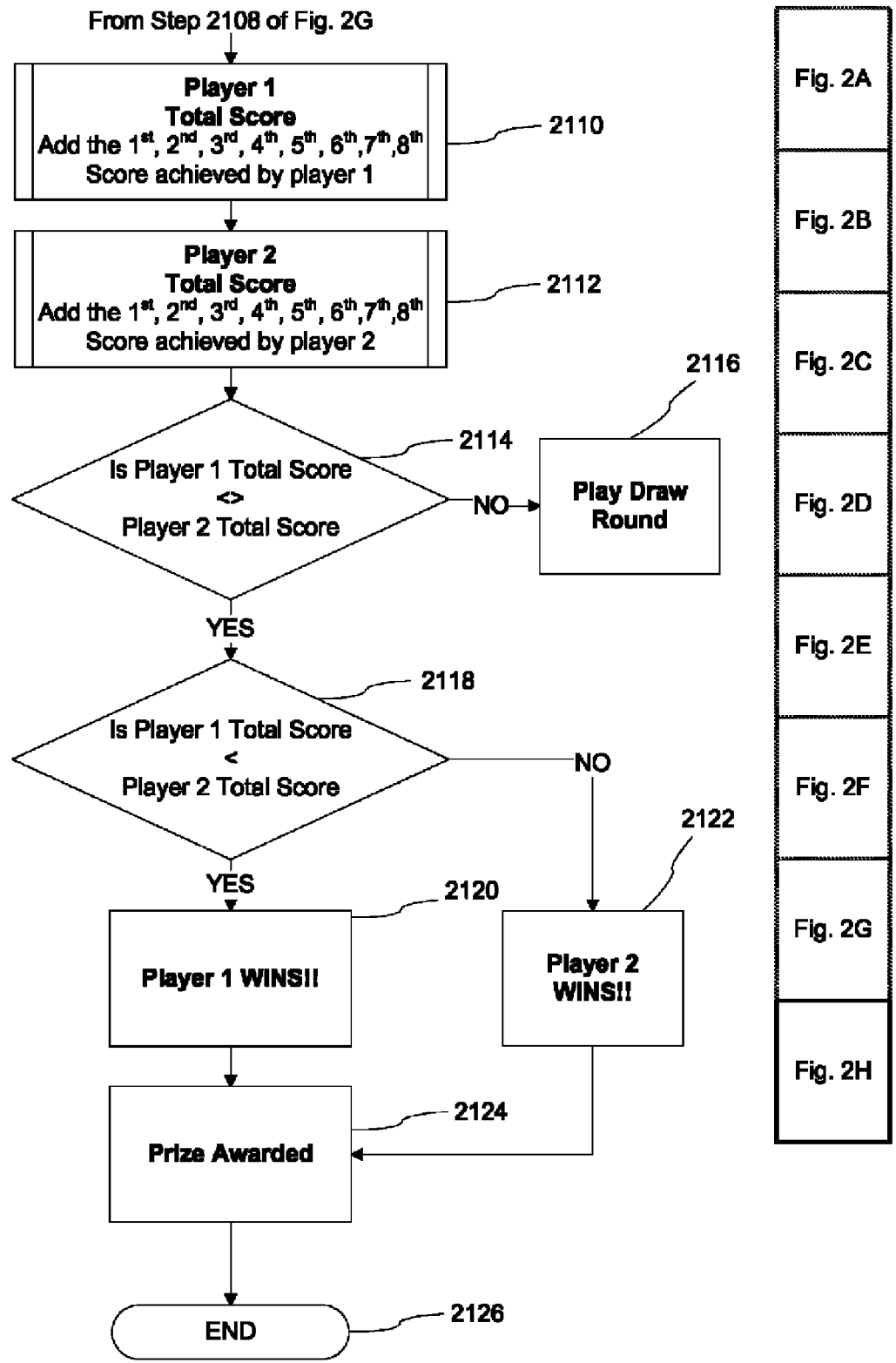

Control passes from step 2108 to step 2110 of FIG. 2H. Step 2110 calculates a total score for the first player by adding up the first score (1), the second score (3), the third score (6), the fourth score (7), the fifth score (3), the sixth score (3), the seventh score (4), and the eighth score (3) to produce a total of 30. The first score (1), the second score (3), the third score (6), the fourth score (7), the fifth score (3), the sixth score (3), the seventh score (4), and the eighth score (3) represent a first set of absolute values for the sequence of revealed tokens for the first player. Thus, the sum of the relative differences between the values associated with consecutively selected tokens provides the total score for the first player. Control passes to step 2112, which calculates a total score for the second player in a manner similar to that described with reference to step 2110. It will be appreciated that the scores of the first and second player can equally be determined in any order or in parallel.

Figure 13:
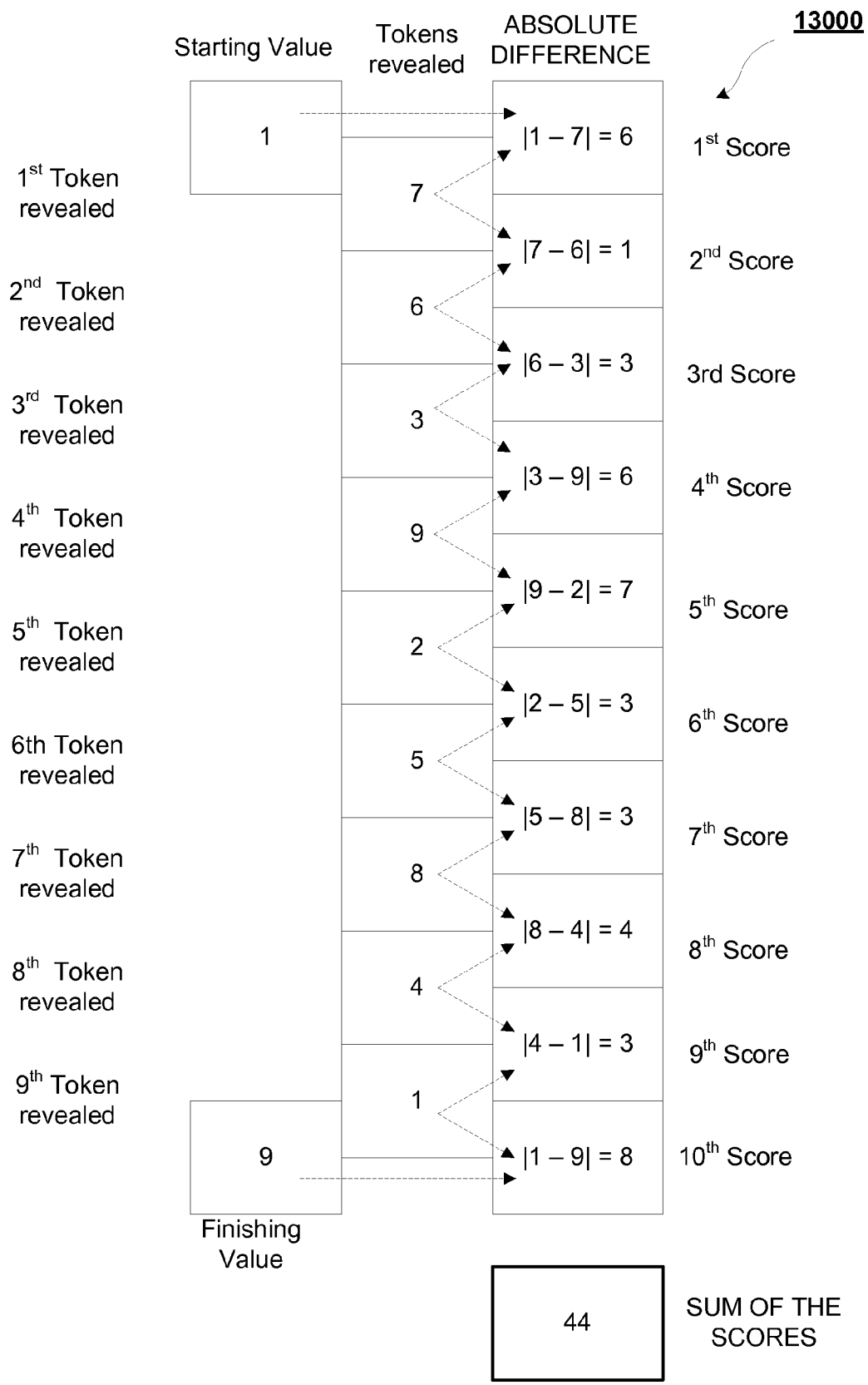
FIG. 13 is a flow diagram of a method of determining scores for the gaming method and system of the present disclosure.

FIG. 13 is an example of an alternative scoring sheet 13000 that can be utilized to track scores during an instance of a game. In this embodiment, a predefined starting value and a predefined finishing value are provided. In this example, the starting value is "1" and the finishing value is "9". The starting value and the finishing values depend on the particular application and can be, for example, predefined values set by a competing player, a game administrator, or a random number generator.

The scoring sheet 13000 shows a first column consisting of 9 cells into which tokens revealed during game play can be placed. The scoring sheet 13000 also shows a second column next to the first column. The second column consists of 10 cells for storing intermediate scores determined from the tokens stored in the adjacent cells of the first column.

In the example of FIG. 13, a sequence of tokens is revealed in the order 7, 6, 3, 9, 2, 5, 8, 4, 1. The method determines a relative difference between the starting value "1" and the value of the first token "7" to produce a first score, or initial score, of |1−7|=6. In contrast to the embodiment and scoring sheet of FIG. 4, a first score is produced in response to the value of the first revealed token, by determining the relative difference between the starting value and the value of the first revealed token. The player does not need to wait for the second token to be revealed before receiving a first score. The method then determines a relative difference between the value of the first token "7" and the value of the second token "6" to produce a second score, |7−6|=1.

The method iterates to produce a series of scores based on the relative differences between consecutively revealed tokens. Accordingly, the method determines a relative difference between the value of the second token "6" and the value of the third token "3" to produce a third score, |6−3|=3. The method determines a relative difference between the value of the third token "3" and the value of the fourth token "9" to produce a fourth score, |3−9|=6. The method determines a relative difference between the value of the fourth token "9" and the value of the fifth token "2" to produce a fifth score, |9−2|=7.

The method determines a relative difference between the value of the fifth token "2" and the value of the sixth token "5" to produce a sixth score, |2−5|=3. The method then determines a relative difference between the value of the sixth token "5" and the value of the seventh token "8" to produce a seventh score, |5−8|=3. The method determines a relative difference between the value of the seventh token "8" and the value of the eighth token "4" to produce an eighth score, |8−4|=4. The method determines a relative difference between the value of the eighth token "4" and the value of the ninth token "1" to produce a ninth score, |4−1|=3. The method then determines a relative difference between the value of the ninth token "1" and the value of the finishing value "9" to produce a tenth score, or finishing score, of |1−9|=8. The total score is the sum of the first to tenth scores, 6+1+3+6+7+3+3+4+3+8=44.

Figure 14:
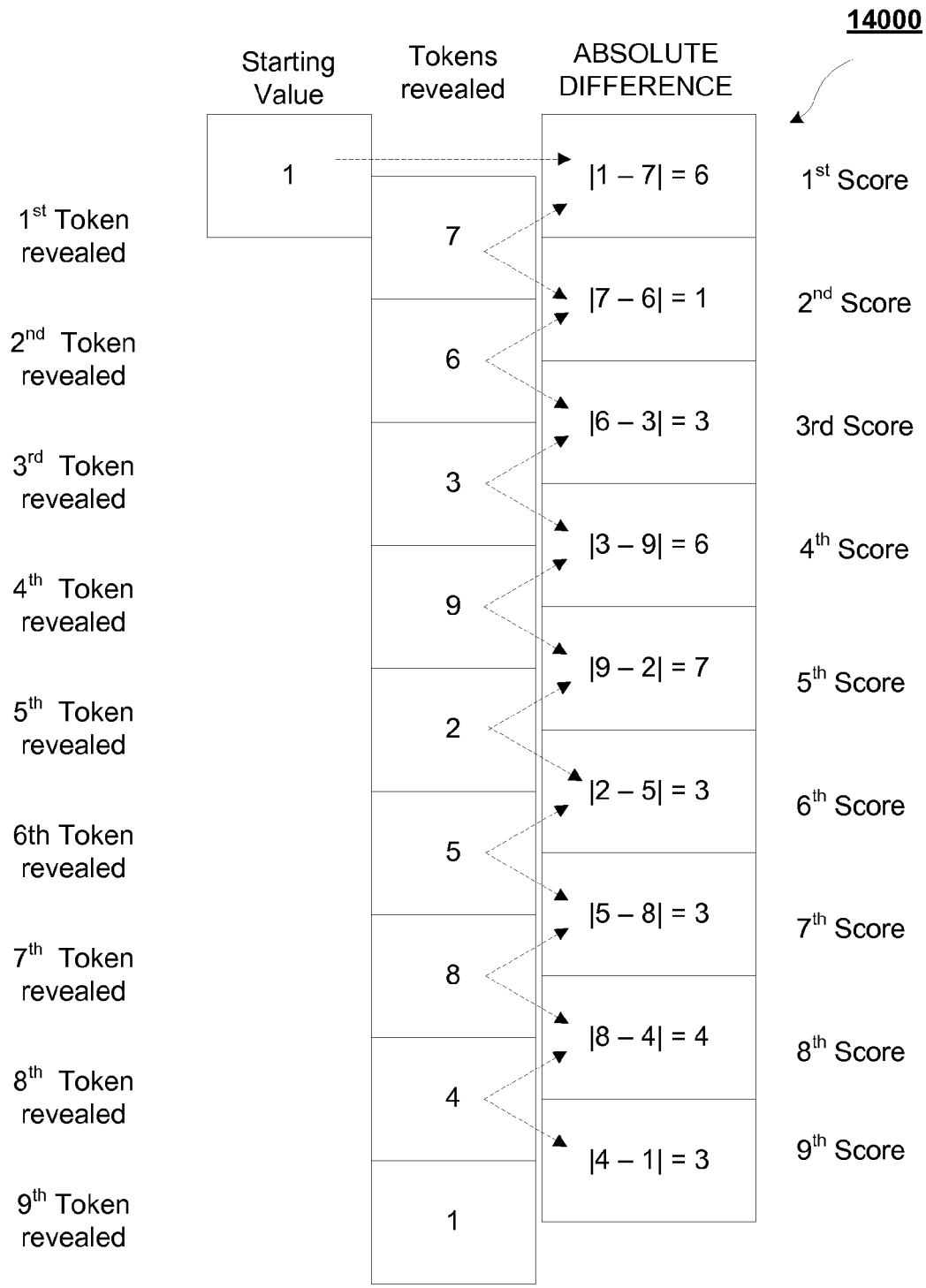
FIG. 14 is a flow diagram of a method of determining scores for the gaming method and system of the present disclosure.

FIG. 14 is an example of an alternative scoring sheet 14000 that can be utilized to track scores during an instance of a game. In this embodiment, a starting value is provided. In contrast to the embodiment of FIG. 13, no finishing value is provided in this embodiment. In this example, the starting value is "1". The starting value depends on the particular application and can be, for example, a predefined value set by a competing player, a game administrator, or a random number generator.

The scoring sheet 14000 shows a first column consisting of 9 cells into which tokens revealed during game play can be placed. The scoring sheet 14000 also shows a second column next to the first column. The second column consists of 9 cells for storing intermediate scores determined from the tokens stored in the adjacent cells of the first column.

In the example of FIG. 14, a sequence of tokens is revealed in the same order as for FIG. 13: 7, 6, 3, 9, 2, 5, 8, 4, 1. As described above with reference to FIG. 13, the method determines a first score by determining the relative difference between the starting value "1" and the value of the first revealed token "7". The method then proceeds in a similar manner to that described above with reference to FIG. 13 to produce second to ninth scores based on the sequence in which the tokens were revealed. In contrast to FIG. 13, there is no finishing value in this embodiment, so the total score is the sum of the first to ninth scores 6+1+3+6+7+3+3+4+3=36.

Figure 15:
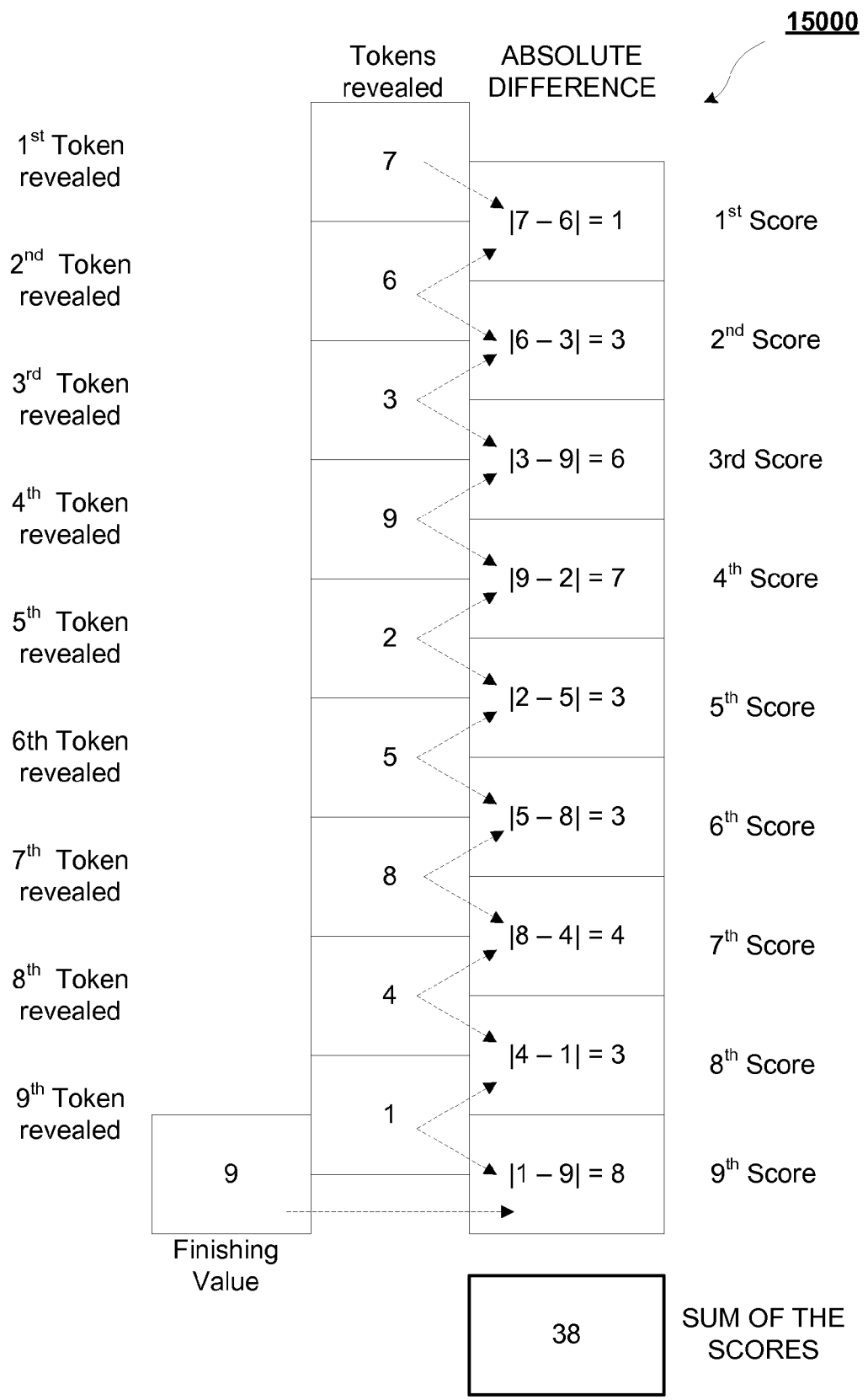
FIG. 15 is a flow diagram of a method of determining scores for the gaming method and system of the present disclosure.

FIG. 15 is an example of an alternative scoring sheet 15000 that can be utilized to track scores during an instance of a game. In this embodiment, a finishing value is provided. In contrast to the embodiment of FIG. 13, no starting value is provided in this embodiment. In this example, the finishing value is "9". The finishing value depends on the particular application and can be, for example, a predefined value set by a competing player, a game administrator, or a random number generator.

The scoring sheet 15000 shows a first column consisting of 9 cells into which tokens revealed during game play can be placed. The scoring sheet 15000 also shows a second column next to the first column. The second column consists of 9 cells for storing intermediate scores determined from the tokens stored in the adjacent cells of the first column.

In the example of FIG. 15, a sequence of tokens is revealed in the same order as for FIG. 13: 7, 6, 3, 9, 2, 5, 8, 4, 1. The method determines a first score by determining the relative difference between the value of the first revealed token "7" and the value of the second revealed token "6", in a manner similar to that described above with reference to FIG. 4. The method then proceeds to produce second to eighth scores by determining the relative differences between the values of consecutively revealed tokens. In contrast to FIG. 4, the embodiment of FIG. 15 determines a ninth score by determining the relative difference between the last revealed token "1" and the value of the finishing value "9", |1−9|=8. The sum of the scores provides a total score for the player, 1+3+6+7+3+3+4+3+8=38.

FIG. 10 is an example of another scoring sheet 10000 that can be utilized to track scores during an instance of a game, wherein a predefined ordered sequence of values is utilized to determine the score, based on the sequence in which the tokens were revealed. In one embodiment, the predefined ordered sequence of values is a set of numbered turns. In another embodiment, the predefined ordered sequence of values is assigned by a random number generator, a competing player, a game administrator, or other means. In one embodiment, the predefined ordered sequence of values is derived from an earlier instance of a game, such as a most recently selected sequence of tokens by a current player or a different player. For example, the predefined ordered sequence of values can be based on a sequence of tokens from an earlier instance of the game, such as a winning sequence, a losing sequence, or randomly selected sequence.

In the example of FIG. 10, the predefined ordered sequence of values is a set of numbered turns, with values from 1 to 9 corresponding to turns 1 to 9. The method determines a relative difference between the value of the token selected by a player on a first turn and the value "1", corresponding to the first turn, to produce a first score. The method then determines a relative difference between the value of the token selected by a player on a second turn and the value "2", corresponding to the second turn, to produce a second score. The method iterates to produce a score for each revealed token.

In the example of FIG. 10, a sequence of 9 tokens is revealed by a player during play of a game. The tokens are numbered 1, 2, 3, 4, 5, 6, 7, 8, 9. The scoring sheet 10000 shows a first column consisting of 9 cells corresponding to an ordered sequence of 9 turns with values from 1 to 9. The scoring sheet 10000 also shows a second column into which tokens revealed during game play can be placed in the order in which the tokens are selected. The scoring sheet 10000 further shows a third column next to the second column, into which an intermediate score can be calculated for each revealed token.

In the example of FIG. 10, the sequence in which the tokens are revealed is 7, 6, 3, 9, 2, 5, 8, 4, 1. The first token revealed was "7" and the first score is the absolute difference between the number of the turn, "1", and the value of the first token "7". Thus, the first score is |1−7|=6. The second token revealed was "6" and the second score is the absolute difference between the number of the turn, "2", and the value of the second token "6". Thus, the second score is |2−6|=4. The third token revealed was "3" and the third score is the absolute difference between the number of the turn, "3", and the value of the third token "3". Thus, the third score is |3−3|=0. The fourth token revealed was "9" and the fourth score is the absolute difference between the number of the turn, "4", and the value of the fourth token "9". Thus, the fourth score is |4−9|=5.

The fifth token revealed was "2" and the fifth score is the absolute difference between the number of the turn, "5", and the value of the fifth token "2". Thus, the fifth score is |5−2|=3. The sixth token revealed was "5" and the sixth score is the absolute difference between the number of the turn, "6", and the value of the sixth token "5". Thus, the sixth score is |6−5|=1. The seventh token revealed was "8" and the seventh score is the absolute difference between the number of the turn, "7", and the value of the seventh token "8". Thus, the seventh score is |7−8|=1. The eighth token revealed was "4" and the eighth score is the absolute difference between the number of the turn, "8", and the value of the eighth token "4". Thus, the eighth score is |8−4|=4. The ninth token revealed was "1" and the ninth score is the absolute difference between the number of the turn, "9", and the value of the ninth token "1". Thus, the ninth score is |9−1|=8. The total score for the player is the sum of the intermediate scores associated with each of the revealed tokens, producing a total of 6+4+0+5+3+1+1+4+8 =32.

FIG. 11 is an example of another scoring sheet 11000 that can be utilized to track scores during an instance of a game, wherein a predefined ordered sequence of values is utilized to determine the score, based on the sequence in which the tokens were revealed.

In the example of FIG. 11, the predefined ordered sequence of values is a predefined ordered sequence of values assigned by a random number generator, a competing player, a game administrator, or other means. In this particular example, the predefined ordered sequence of values is 4, 7, 2, 5, 9, 3, 6, 8, 1. The method determines a relative difference between the value of the token selected by a player with a corresponding value from the ordered sequence of values to produce a score for each selected token.

In the example of FIG. 11, a sequence of 9 tokens is revealed by a player during play of a game. The tokens are numbered 1, 2, 3, 4, 5, 6, 7, 8, 9. The scoring sheet 11000 shows a first column consisting of 9 cells corresponding to an ordered sequence of 4, 7, 2, 5, 9, 3, 6, 8, 1. The scoring sheet 11000 also shows a second column into which tokens revealed during game play can be placed in the order in which the tokens are selected. The scoring sheet 11000 further shows a third column next to the second column, into which a score can be calculated for each revealed token.

In the example of FIG. 11, the sequence in which the tokens are revealed is 7, 6, 3, 9, 2, 5, 8, 4, 1. The first token revealed was "7" and the first score is the absolute difference between the first value in the predefined ordered sequence of values, "4", and the value of the first token "7". Thus, the first score is |4−7|=3. The second token revealed was "6" and the second score is the absolute difference between the second value in the predefined ordered sequence of values, "7", and the value of the second token "6". Thus, the second score is |7−6|=1. The third token revealed was "7" and the third score is the absolute difference between the third value in the predefined ordered sequence of values, "2", and the value of the third token "3". Thus, the third score is |2−3|=1. The fourth token revealed was "9" and the fourth score is the absolute difference between the fourth value in the predefined ordered sequence of values, "5", and the value of the fourth token "9". Thus, the fourth score is |5−9|=4.

The fifth token revealed was "2" and the fifth score is the absolute difference between the fifth value in the predefined ordered sequence of values, "9", and the value of the fifth token "2". Thus, the fifth score is |9−2|=7. The sixth token revealed was "5" and the sixth score is the absolute difference between the sixth value in the predefined ordered sequence of values, "3", and the value of the sixth token "5". Thus, the sixth score is |3−5|=2. The seventh token revealed was "8" and the seventh score is the absolute difference between the seventh value in the predefined ordered sequence of values, "6", and the value of the seventh token "8". Thus, the seventh score is |6−8|=2. The eighth token revealed was "4" and the eighth score is the absolute difference between the eighth value in the predefined ordered sequence of values, "8", and the value of the eighth token "4". Thus, the eighth score is |8−4|=4. The ninth token revealed was "1" and the ninth score is the absolute difference between the ninth value in the predefined ordered sequence of values, "1", and the value of the ninth token "1". Thus, the ninth score is |1−1|=0. The total score for the player is the sum of the intermediate scores associated with each of the revealed tokens, producing a total of 3+1+1+4+7+2+2+4+0 =24.

FIG. 12 is an example of another scoring sheet 12000 that can be utilized to track scores during an instance of a game, wherein a predefined ordered sequence of values is utilized to determine the score, based on the sequence in which the tokens were revealed. In the example of FIG. 12, the tokens correspond to the twelve signs of the Zodiac, wherein a value is assigned to each sign in accordance with Table 1:

TABLE 1

| | | |
|---|---|---|
| ♈ | (Aries) | Value 500 |
| ♉ | (Taurus) | Value 1000 |
| ♊ | (Gemini) | Value 1500 |
| ♋ | (Cancer) | Value 2000 |
| ♌ | (Leo) | Value 2500 |
| ♍ | (Virgo) | Value 3000 |
| ♎ | (Libra) | Value 3500 |
| ♏ | (Scorpio) | Value 4000 |
| ♐ | (Sagittarius) | Value 4500 |
| ♑ | (Capricorn) | Value 5000 |
| ♒ | (Aquarius) | Value 5500 |
| ♓ | (Pisces) | Value 6000 |

In the example of FIG. 12, the predefined ordered sequence of values is a predefined ordered sequence of values assigned by a random number generator, a competing player, a game administrator, or other means. In this particular example, the predefined ordered sequence of values is ♈, ♉, ♊, ♋, ♌, ♍, ♎, ♏, ♐, ♑, ♒, ♓. The method determines a relative difference between the value of the token selected by a player with a corresponding value from the ordered sequence of values to produce a score for each selected token.

In the example of FIG. 12, a sequence of 12 tokens is revealed by a player during play of a game. The scoring sheet 12000 shows a first column consisting of 12 cells corresponding to an ordered sequence of ♈, ♉, ♊, ♋, ♌, ♍, ♎, ♏, ♐, ♑, ♒, ♓ with the values shown in Table 1. The scoring sheet 12000 also shows a second column into which tokens revealed during game play can be placed in the order in which the tokens are selected. The scoring sheet 12000 further shows a third column next to the second column, into which a score can be calculated for each revealed token.

In the example of FIG. 12, the sequence in which the tokens are revealed is ♒, ♏, ♈, ♌, ♊, ♐, ♋, ♑, ♓, ♉, ♍, ♎. The first token revealed was "♒" and the first score is the absolute difference between the first value in the predefined ordered sequence of values, "♈" with value 500, and the value of the first token "♒", 5500. Thus, the first score is |500−5500|=5000. The second token revealed was "♏" and the second score is the absolute difference between the second value in the predefined ordered sequence of values, "♉" with value 1000, and the value of the second token "♏", 4000. Thus, the second score is |1000−4000|=3000. The third token revealed was "♈" and the third score is the absolute difference between the third value in the predefined ordered sequence of values, "♊" with value 1500, and the value of the third token "♈", 500. Thus, the third score is |1500−500|=1000. The fourth token revealed was "♌" and the fourth score is the absolute difference between the fourth value in the predefined ordered sequence of values, "♋" with value 2000, and the value of the fourth token "♌", 2500. Thus, the fourth score is |2000−2500|=500.

The fifth token revealed was "♊" and the fifth score is the absolute difference between the fifth value in the predefined ordered sequence of values, "♌" with value 2500, and the value of the fifth token "♊", 1500. Thus, the fifth score is |2500−1500|=1000. The sixth token revealed was "♐" and the sixth score is the absolute difference between the sixth value in the predefined ordered sequence of values, "♍" with value 3000, and the value of the sixth token "♐", 4500. Thus, the sixth score is |3000−4500|=1500. The seventh token revealed was "♋" and the seventh score is the absolute difference between the seventh value in the predefined ordered sequence of values, "♎" with value 3500, and the value of the seventh token "♋", 2000. Thus, the seventh score is |3500−2000|=1500. The eighth token revealed was "♑" and the eighth score is the absolute difference between the eighth value in the predefined ordered sequence of values, "♏" with value 4000, and the value of the eighth token "♑", 5000. Thus, the eighth score is |4000−5000|=1000.

The ninth token revealed was "♓" and the ninth score is the absolute difference between the ninth value in the predefined ordered sequence of values, "♐" with value 4500, and the value of the ninth token "♓", 6000. Thus, the ninth score is |4500−6000|=1500. The tenth token revealed was "♉" and the tenth score is the absolute difference between the tenth value in the predefined ordered sequence of values, "♑" with value 5000, and the value of the tenth token "♉", 1000. Thus, the tenth score is |5000−1000|=4000. The eleventh token revealed was "♍" and the eleventh score is the absolute difference between the eleventh value in the predefined ordered sequence of values, "♒" with value 5500, and the value of the eleventh token "♍", 3000. Thus, the eleventh score is |5000−3000|=2000. The twelfth token revealed was "♓" and the twelfth score is the absolute difference between the twelfth value in the predefined ordered sequence of values, "♓" with value 6000, and the value of the twelfth token "♎", 3500. Thus, the twelfth score is |6000−3500|=2500. The total score for the player is the sum of the scores, producing a total of 5000+3000+1000+500+1000+1500+1500+1000+1500+4000+2500+2500=25,000.

Returning to FIG. 3H, having determined the total scores for the first and second players, control passes to a decision step 2114, which determines whether the total score of the first player is not equal to the total score of the second player. If the scores are equal, No, control passes to step 2116 in which the first and second player play a "draw round". If the total scores of the first and second players are not equal, Yes, control passes from step 2114 to decision step 2118, which determines whether the total score of the first player is less than the total score of the second player. If the total score of the first player is less than the total score of the second player, Yes, control passes to step 2120 which allocates the first player as the winner. Control passes to step 2124, which awards a prize, and the method 2000 terminates at step 2126. However, if at step 2118 the total score of the first player is not less than the total score of the second player, No, control passes to step 2122 which allocates the second player as the winner. Control then passes to step 2124.

The "draw round" of step 2116 can be implemented in many different ways. For example, the first and second players can play another game or a subset thereof. Alternatively, the first and second players can each pick a number from a predefined range of numbers, with the winner being the player who selected a higher (or lower) number. As described above, a draw can also be settled using "BLACK/RED", "pick the number", "Closest guess", Draw can be settled based on the prior performance of players in the game, such as the player whose total score was lower to the other player in a prior score sequence before the draw occurred or the player who scored the lowest score in the previous score sequence(s) or the player who discover the lowest or highest number(s) first during the game. In a further alternative, a winner is allocated by a random number generator executing on a processor of a computing device.

Figure 6A:
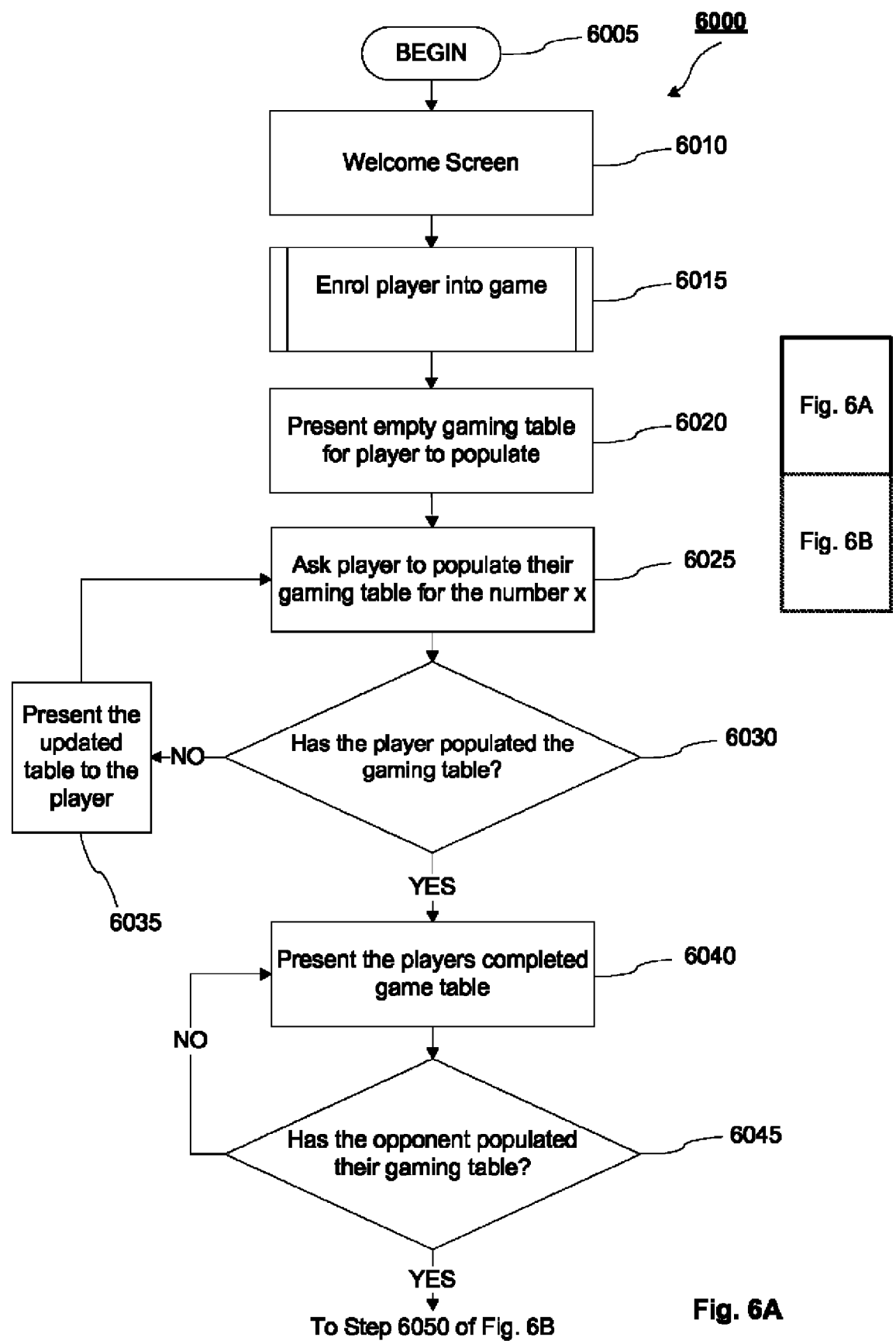
FIGS. 6A and 6B are a flow diagram of player interaction while playing a gaming method according to an embodiment of the present disclosure.
Figure 6B:
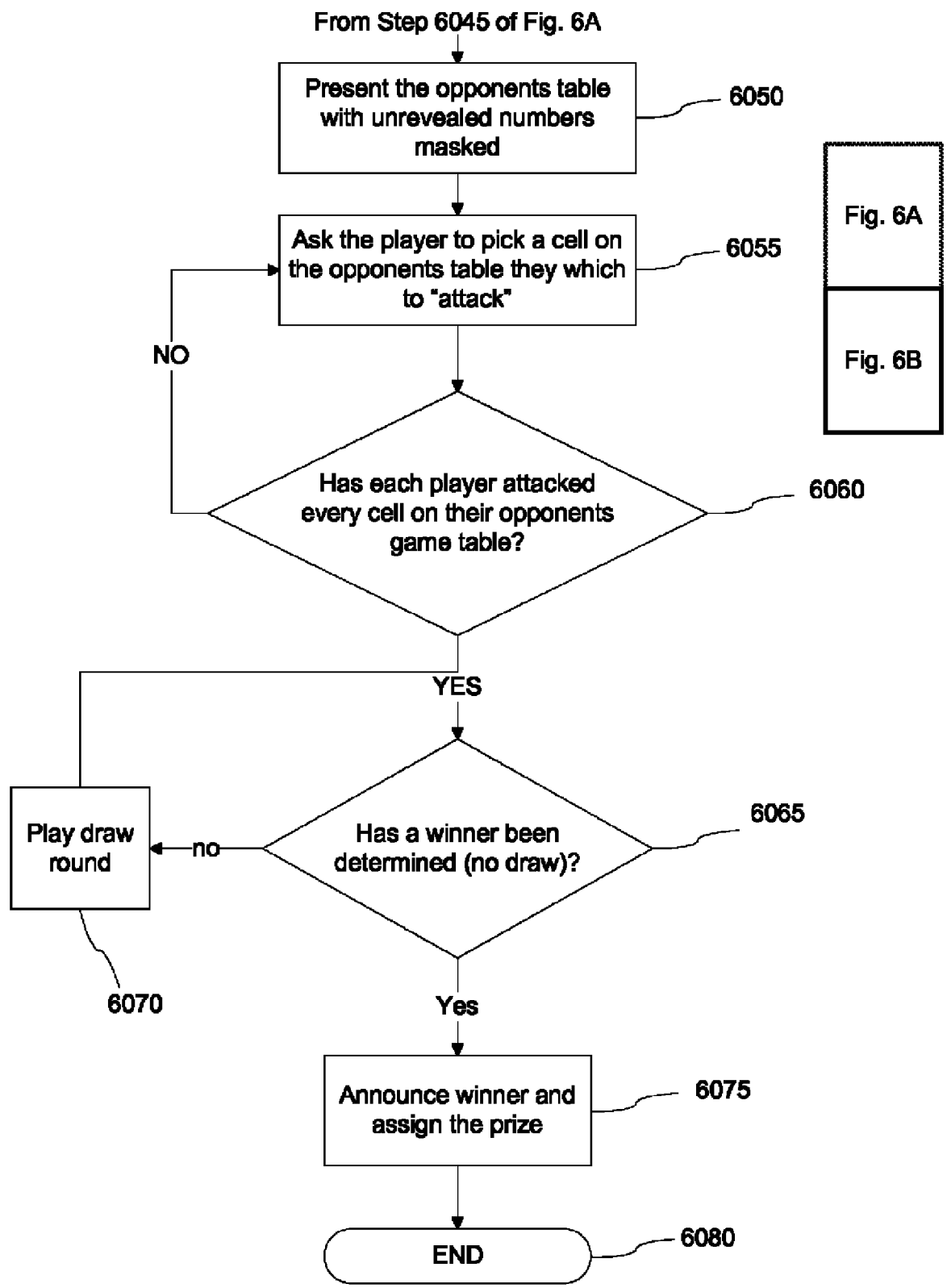

FIG. 6 is a flow diagram 6000 of a user experience of playing a game in accordance with the present disclosure. The process 6000 begins at a Begin step 6005 and proceeds to the display of a welcome screen at step 6010. Control passes to step 6015 in which the player enrolls in the game. Step 6020 presents an empty gaming table for the player to populate with a sequence of tokens. In this embodiment, control passes to step 6025 in which the player is asked to populate the gaming table for a given token. Alternatively, the player is asked to populate a cell of the gaming table.

Control passes to decision step 6030 which determines whether the player has populated the gaming table. If the player has not populated the gaming table, No, control passes to 6035 which presents the updated table to the player and returns control to step 6025 to continue populating the gaming table. However, if that decision step 6035 the player has populated the gaming table, Yes, control passes to step 6040 which presents the player's completed gaming table. Control passes to step 6045 which determines whether an opponent has populated a corresponding gaming table. If no, control returns to 6040 in which the player's own completed gaming table is again presented. Control again returns to decision step 6045 and once the opponent has populated their gaming table, Yes, control passes to step 6050 of FIG. 6B which presents the opponent's table with unrevealed numbers masked to the first player.

Step 6055 asks the first player to pick a cell on the table of the opponent and control passes to decision step 6060. Step 6060 determines whether each player has attacked every cell on their opponent's gaming table. If Yes, control passes to a further decision step 6065. However, if each player has not attacked every cell on their opponent's gaming table, No, control returns to step 6055.

Decision step 6065 determines whether a winner has been identified. If No, control passes to step 6070 to play a draw round and then control returns to decision step 6065. If a winner has been determined at step 6065, Yes, control passes to step 6075 which announces a winner and assigns a prize. Control passes to step 6080 and the process terminates.

Game Variants

One embodiment of the present disclosure allows a player to rearrange, during play of the game, one or more of the tokens that are yet to be revealed among the cells that are yet to be selected by a competing player. Thus, a player that is about to have a token revealed from his gaming table is allowed to reallocate a predefined number of the remaining tokens that are yet to be revealed in the cells that are yet to be selected by a competing player. The number of tokens that can be re allocated can vary from zero to all of the remaining tokens, depending on the particular application.

This variant of the game provides an extra level of entertainment and skill, as the players try to identify a search pattern being employed by an opponent. For example, if the player believes that the opponent is simply traversing a grid of a gaming table from left to right and top to bottom, the player can reorder the remaining tokens to produce a sequence that will yield a poor score for the opponent.

A further embodiment of the present disclosure allows a player to place a bet or stake associated with an instance of the game. The stake may simply comprise an entry fee for playing the game. In one embodiment, a player is able to increase the stake or bet during the game play. In one implementation, a player is able to change the stake or bet on each attacking iteration. This embodiment allows a player to increase a stake or bet if the player progressively reveals a sequence of consecutive tokens, thus yielding a high degree of confidence in obtaining a low, winning score. The players may be able to agree mutually to increase their wager amounts during these rounds. The bets or stakes can be real money or credits managed by a third party. Alternatively, the bets or stakes can be virtual money or credits.

Player Participation

As described above, various embodiments of the gaming method in accordance with the present disclosure can be implemented in many ways, including: (i) standalone with a single player against a competitor or a single competitor against a game controller; and (ii) peer-to-peer with two players competing directly against each other. The objective in each implementation is for a player to obtain the lowest score. Thus, in standalone mode the player competes against a database of known low scores and in the peer-to-peer mode the player competes against the score of the opponent.

A number of contestants can be organized in many ways to play a series of games to identify an overall winner. In one implementation, a series of peer-to-peer games are played among the contestants in a knockout format, where one contestant is eliminated from each game until an ultimate winner is determined. Thus, a group of 32 contestants will require 16 initial peer-to-peer matches. The winners of those matches will play a second round of 8 matches, with the winners of those matches playing a further 4 matches. The winners of the round of 4 matches will play the semi-finals and the winners of the semi-finals will play the final match to determine the ultimate winner. Such playoff arrangements can be enhanced by seeding contestants and utilizing byes to fill the playoff roster, as commonly utilized in sporting competitions.

An alternative implementation utilizes a round-robin tournament, wherein each participant plays every other participant an equal number of times. The participant with the lowest cumulative score wins the entire tournament.

A further implementation provides a tournament beginning with a round-robin component to identify a subset of the contestants. The subset of contestants then compete in playoffs and then ultimately compete in a grand final peer-to-peer contest.

Prizes

Different embodiments of the gaming method and system of the present disclosure utilize different prize schemes. In one implementation, the score itself is the prize and no further benefit is awarded to the player. Such a prize is utilized in a computing device, for example, in which the player sequentially guesses the locations of the tokens of a predefined sequence. A score is determined based on the values associated with the tokens and in light of the sequence in which the player guessed the respective tokens. One implementation of such a computing device includes a database of lowest scores, so that a player can compare himself to other players and/or his earlier attempts.

A further embodiment is associated with a prize pool. Each player pays a fee upon registration. A portion of the prize pool is then paid to the winner. The prize pool can optionally include prizes for 2nd, 3rd and even subsequent places. The specific prizes awarded will depend on each particular implementation.

Gaming Platforms

Board Game

One embodiment of a gaming method and system in accordance with the present disclosure provides a gaming table in the form of a board having printed thereon a number of cells. Each of the cells is associated with a unique identifier, so that each cell can be readily referenced by an opposing player. The unique identifiers can be grid references, such as A1 to C3 for the 3×3 grid embodiment described above. Alternatively, any other unique identifiers such as numbers, letters, colors, or a combination thereof can equally be utilized. The number of cells is equal to the number of tokens that is to be placed on the gaming table; each token is placed on a cell during play of the game, as described above.

Each gaming table is associated with a corresponding set of tokens, with each token having an associated value. One embodiment of the gaming table provides a scoring area, such as that shown in FIG. 4. Alternative scoring tables and wheels can equally be utilized. A further embodiment provides a player with a first gaming table showing where the player has placed his tokens and a second gaming table that the player completes as the tokens from the opposing player's table are revealed.

Computing Device

One embodiment utilizes a computing device to allow a player to compete either against the computing device itself or with a second player coupled to the same computing device. The second player can be coupled directly to the computing device or alternatively the second player can be coupled to the computing device via a communications network, such as the Internet, or via an ad-hoc wireless link, such as provided by Bluetooth. In a single player mode, an application executing on a processor in the computing device populates a gaming table with a set of tokens. The gaming table is presented to the player via a display means, with all of the cells initially covered. As the player selects cells, the selected cells are each, in turn, uncovered to reveal the tokens located therein. The computing device records the sequence in which the player selects the cells to be revealed and the tokens that are revealed at each turn to determine a score. Visual and audio feedback are readily provided via the display means and speakers.

The computing device can be implemented by, for example, but is not limited to, a portable handheld gaming computer, a personal digital assistant (PDA), a dedicated gaming machine, a mobile telephone handset, a laptop computer, a desktop computer, or a proprietary gaming and/or wagering terminal. The player can provide input in many ways, including using a QWERTY keypad, a numeric keypad, a touchscreen, a joystick, a scratch pad, a stylus, or any combination thereof.

Figure 7:
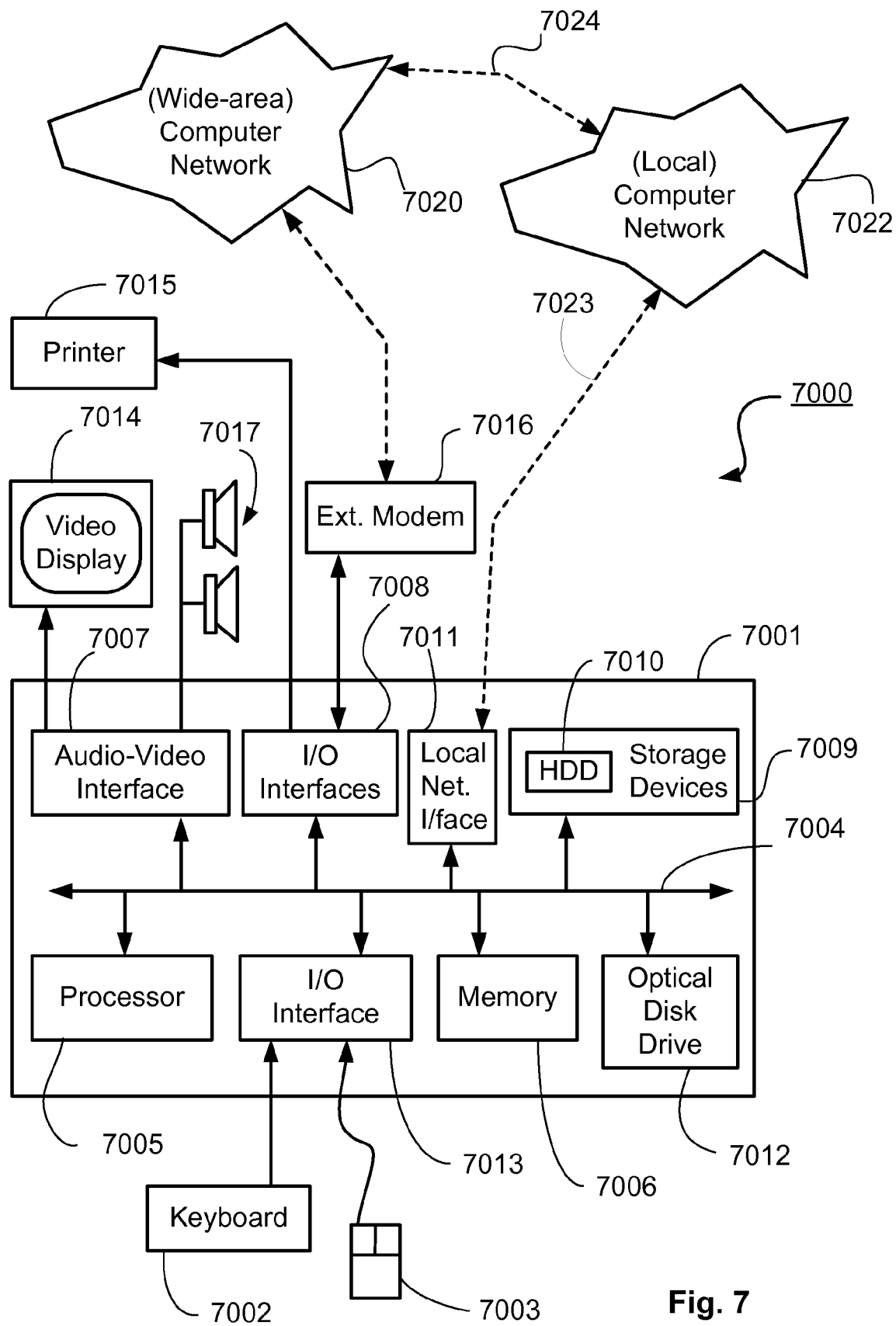
FIG. 7 is a schematic block diagram of a general purpose computer upon which arrangements described can be practiced.

The method of gaming may be implemented using a computer system 7000, such as that shown in FIG. 7, wherein the processes of FIGS. 1 to 4 and 6 may be implemented as software, such as one or more application programs executable within the computer system 7000. In particular, the steps of the method of gaming are effected by instructions in the software that are carried out within the computer system 7000. The instructions may be formed as one or more code modules, each for performing one or more particular tasks. The software may also be divided into two separate parts, in which a first part and the corresponding code modules perform the registration, setting up, playing and scoring methods and a second part and the corresponding code modules manage a user interface between the first part and the user. The software may be stored in a computer readable medium, including the storage devices described below, for example. The software is loaded into the computer system 7000 from the computer readable medium, and then executed by the computer system 7000. A computer readable medium having such software or computer program recorded on it is a computer program product. The use of the computer program product in the computer system 7000 preferably effects an advantageous apparatus for gaming and entertainment.

As seen in FIG. 7, the computer system 7000 is formed by a computer module 7001, input devices such as a keyboard 7002 and a mouse pointer device 7003, and output devices including a printer 7015, a display device 7014 and loudspeakers 7017. The input devices may also include, but are not limited to, one or more of a customised keypad, a touchscreen, a scratch pad, and a stylus, which are not illustrated. An external Modulator-Demodulator (Modem) transceiver device 7016 may be used by the computer module 7001 for communicating to and from a communications network 7020 via a connection 7021. The network 7020 may be a wide-area network (WAN), such as the Internet or a private WAN. Where the connection 7021 is a telephone line, the modem 7016 may be a traditional "dial-up" modem. Alternatively, where the connection 7021 is a high capacity (e.g., cable) connection, the modem 7016 may be a broadband modem. A wireless modem may also be used for wireless connection to the network 7020.

The computer module 7001 typically includes at least one processor unit 7005, and a memory unit 7006 for example formed from semiconductor random access memory (RAM) and read only memory (ROM). The module 7001 also includes an number of input/output (I/O) interfaces including an audio-video interface 7007 that couples to the video display 7014 and loudspeakers 7017, an I/O interface 7013 for the keyboard 7002 and mouse 7003 and optionally one or more of a joystick, a customised keypad, a touchscreen, a scratch pad, and a stylus (not illustrated), and an interface 7008 for the external modem 7016 and printer 7015. In some implementations, the modem 7016 may be incorporated within the computer module 7001, for example within the interface 7008. The computer module 7001 also has a local network interface 7011 which, via a connection 7023, permits coupling of the computer system 7000 to a local computer network 7022, known as a Local Area Network (LAN). As also illustrated, the local network 7022 may also couple to the wide network 7020 via a connection 7024, which would typically include a so-called "firewall" device or similar functionality. The interface 7011 may be formed by an Ethernet™ circuit card, a wireless Bluetooth™ or an IEEE 802.11 wireless arrangement.

The interfaces 7008 and 7013 may afford both serial and parallel connectivity, the former typically being implemented according to the Universal Serial Bus (USB) standards and having corresponding USB connectors (not illustrated). Storage devices 7009 are provided and typically include a hard disk drive (HDD) 7010. Other devices such as a floppy disk drive and a magnetic tape drive (not illustrated) may also be used. An optical disk drive 7012 is typically provided to act as a non-volatile source of data. Portable memory devices, such optical disks (e.g., CD-ROM, DVD), USB-RAM, and floppy disks for example may then be used as appropriate sources of data to the system 7000.

The components 7005, to 7013 of the computer module 7001 typically communicate via an interconnected bus 7004 and in a manner which results in a conventional mode of operation of the computer system 7000 known to those in the relevant art. Examples of computers on which the described arrangements can be practiced include IBM-PCs and compatibles, Sun Sparcstations, Apple Mac™ or alike computer systems evolved therefrom.

Typically, the application programs discussed above are resident on the hard disk drive 7010 and read and controlled in execution by the processor 7005. Intermediate storage of such programs and any data fetched from the networks 7020 and 7022 may be accomplished using the semiconductor memory 7006, possibly in concert with the hard disk drive 7010. In some instances, the application programs may be supplied to the user encoded on one or more CD-ROM and read via the corresponding drive 7012, or alternatively may be read by the user from the networks 7020 or 7022. Still further, the software can also be loaded into the computer system 7000 from other computer readable media. Computer readable media refers to any storage medium that participates in providing instructions and/or data to the computer system 7000 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 7001. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 7014. Through manipulation of an input device such as the keyboard 7002 and the mouse 7003, a user of the computer system 7000 and the application may manipulate the interface to provide controlling commands and/or input to the applications associated with the GUI(s).

The method of gaming may alternatively be implemented in dedicated hardware such as one or more integrated circuits performing the functions or sub functions of registration, populating a gaming table, playing, and scoring. Such dedicated hardware may include graphic processors, digital signal processors, or one or more microprocessors and associated memories.

Mobile Telephone Handset

In one implementation, the gaming system utilizes a mobile telephone handset. The game is presented as an application running on the handset as a standalone application or alternatively over a communications network from a remote server to the mobile telephone handset. For example, the game can be implemented as a JAVA-based game, interactive video voice response service and/or 3rd party gaming systems.

An embodiment of the gaming method and system implemented on a mobile telephone handset is constrained by the capabilities of an available network provider and capabilities of a user's mobile handset. In one embodiment, a player utilizes a mobile telephone handset to access a gaming server via a communications network.

Figure 5:
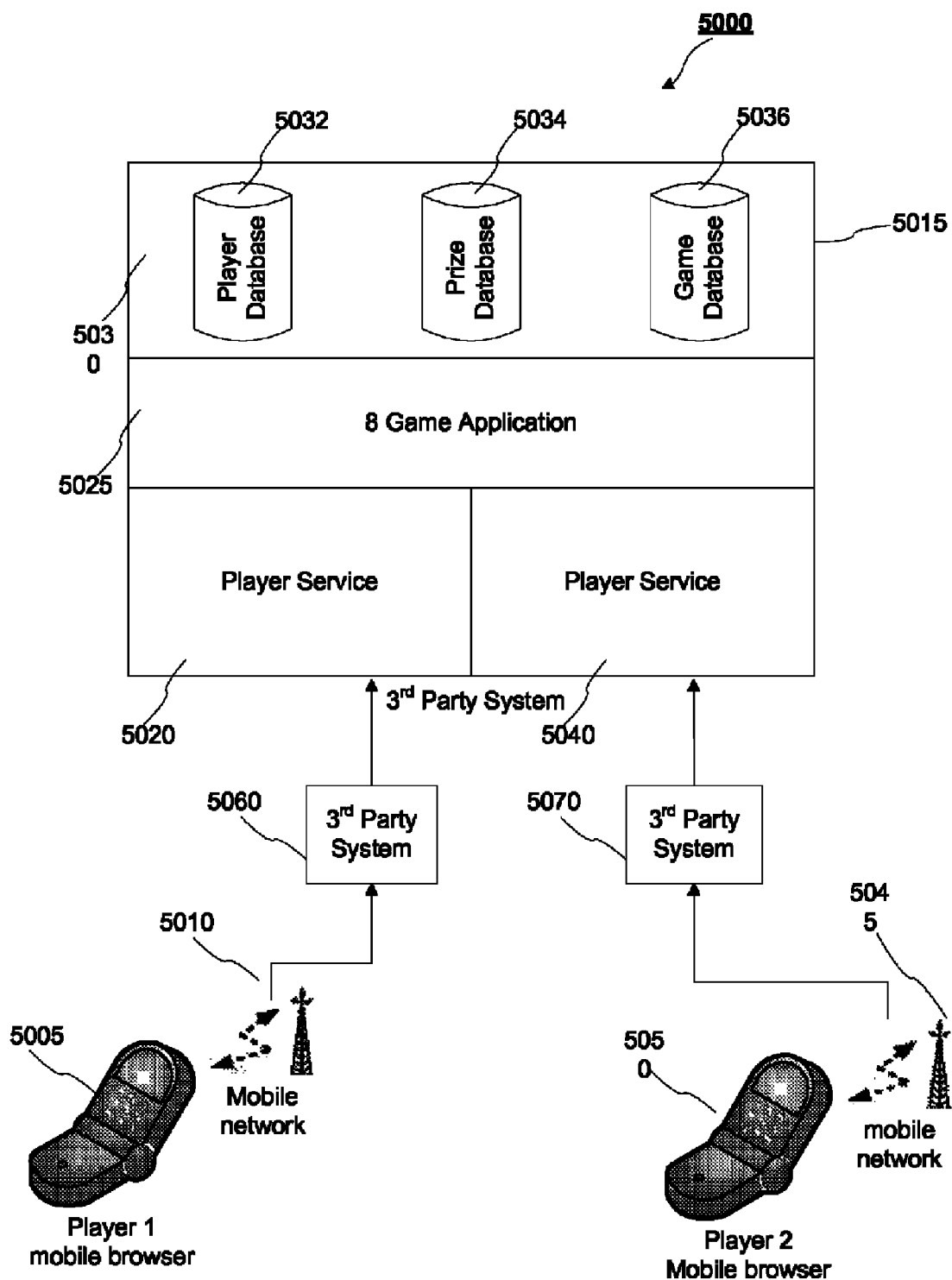
FIG. 5 is a schematic block diagram representation of a gaming system according to an embodiment of the present disclosure.

FIG. 5 is a schematic block diagram representation of a system 5000 on which an embodiment of the gaming process of FIGS. 1 to 4 and 6 may be practiced. In particular, FIG. 5 shows an arrangement that facilitates the playing of a game between a first player on a first mobile telephone handset and a second player on a second mobile telephone handset. The first player utilizes a mobile browser 5005 to communicate via a mobile network 5010 to a gaming server 5015. Similarly, a second player uses a second mobile browser 5050 to communicate via a mobile network 5045 to the gaming server 5015.

Some of the device game experiences require interconnectivity with one or more third party systems between the gaming server and the mobile telephone handset. In one implementation, third party systems provide an integration service between the mobile telephone handset and its associated capabilities and the gaming server. Accordingly, the embodiment shown in FIG. 5 includes a third party system 5060 located between the mobile network 5010 and the gaming server 5015. Similarly, a third party system 5070 is located between the mobile network 5045 and the gaming server 5015.

The gaming server 5015 includes a first player service module 5020 which acts as an interface for exchanging data with the first mobile browser 5005. The first player service module 5020 is coupled to a game application 5025. The gaming server 5015, in the embodiment shown, includes a second player service module 5040 for exchanging data with the second mobile browser 5050. The second player service module 5040 is also coupled to the game application 5025. Coupled to the game application 5025 is a storage means 5030. In the embodiment shown in FIG. 5, the storage means includes a player database 5032, a prize database 5034, and a game database 5036.

The gaming application 5025 manages the following functionality:
1. Games Sessions;
2. Player Sessions;
3. Scoring;
4. Wagering;
5. Prizes;
6. Reporting;
7. Administration;
8. and other associated aspects to the conduct of the game(s).

The gaming application 5025 also facilitates the exchange of data between the player service and the associated databases.

The use of a 3×3 gaming table can be easily represented on a mobile telephone handset interface and the phone keys 1,2,3,4,5,6,7,8,9 are also in a 3×3 grid which can be utilized to receive input from the user in an efficient manner. For example, during player setup, a player can readily utilize the keypad to select a cell to locate a token, perhaps in response to a prompt from the game application 5025, such as "Where in the game table do you want to place the number x? Use your keypad to confirm". The keypad can also be readily utilized during the "attack" mode, to select a cell to be revealed. For example, the game application 5025 can ask "Where on the game table do you do you think the {next best sequence number} is? Use your keypad to guess."

Mobile communication devices with touchscreens enable a user to use their touch to determine directly the interaction between the device and themselves. Consequently, the user can thus place tokens in cells and select cells to be revealed simply by touching the appropriate portion of screen real-estate at the relevant time.

One implementation of the gaming server 5015 provides a "player service" that facilitates the provision of a game in accordance with the present disclosure over multiple platforms. Such platforms include different mobile telephone handsets and communication carrier capabilities. Examples of the connectivity provide by the player service include, but are not limited to:

1. HTML mobile browser—a mobile browser that supports HTML (or derivatives thereof such as XHTML) connects to the player service and is treated similarly to a standard web browser allowing the handset browser to be served pages from web servers within the player service.
2. JAVA mobile browser—the JAVA based browser client receives game service information through the player service via XML.
3. Interactive Video and Voice Response—the mobile call browser (which is the software that handles normal phone and video calls) is able to dial into the "player service" via telephone circuits (ISDN). The mobile browser connects to an IVVR system, which allows a player to view and interact to the game via an interactive video service.
4. 3rd Party Systems—proprietary third party systems may be integrated into the player service via published application programming interfaces (APIs) and supporting software development kits (SDKs). This allows extension of the gaming experience across proprietary platforms.

In one implementation, the mobile telephone handset utilizes Unstructured Supplementary Services Data (USSD) for transmitting information from the mobile browser 5005 to the gaming server 5015 via a Global System for Mobiles (GSM) mobile telephony network. A USSD Gateway routes USSD messages from the signaling network to service applications and back. USSD is a session-based protocol, unlike Short Message Service (SMS) and Multimedia Messaging Service (MMS), and thus a USSD session needs to be allocated to each and every interaction. USSD sessions are able to connect users directly to a gaming application executing on the gaming server 5015.

Online Adaptation

As described above, the game is adaptable to be played in a computing device. In one implementation, the game is played in a manner similar to that described above with respect to mobile telephone handsets, except in this implementation the browser is a web based HTML browser.

3rd Party (Gaming) Systems

Proprietary third party gaming systems will also be integrated via published APIs and supporting SDKs. This will allow extension of the gaming experience across proprietary platforms. For example, proprietary platforms may be provided by wagering agencies and betting providers. Such a 3rd party gaming system may provide, for example, a gaming terminal that includes the functionality of the remote computing device 5005 of FIG. 5 and the 3rd party system 5060 of FIG. 5 in an integrated device.

Figure 9:
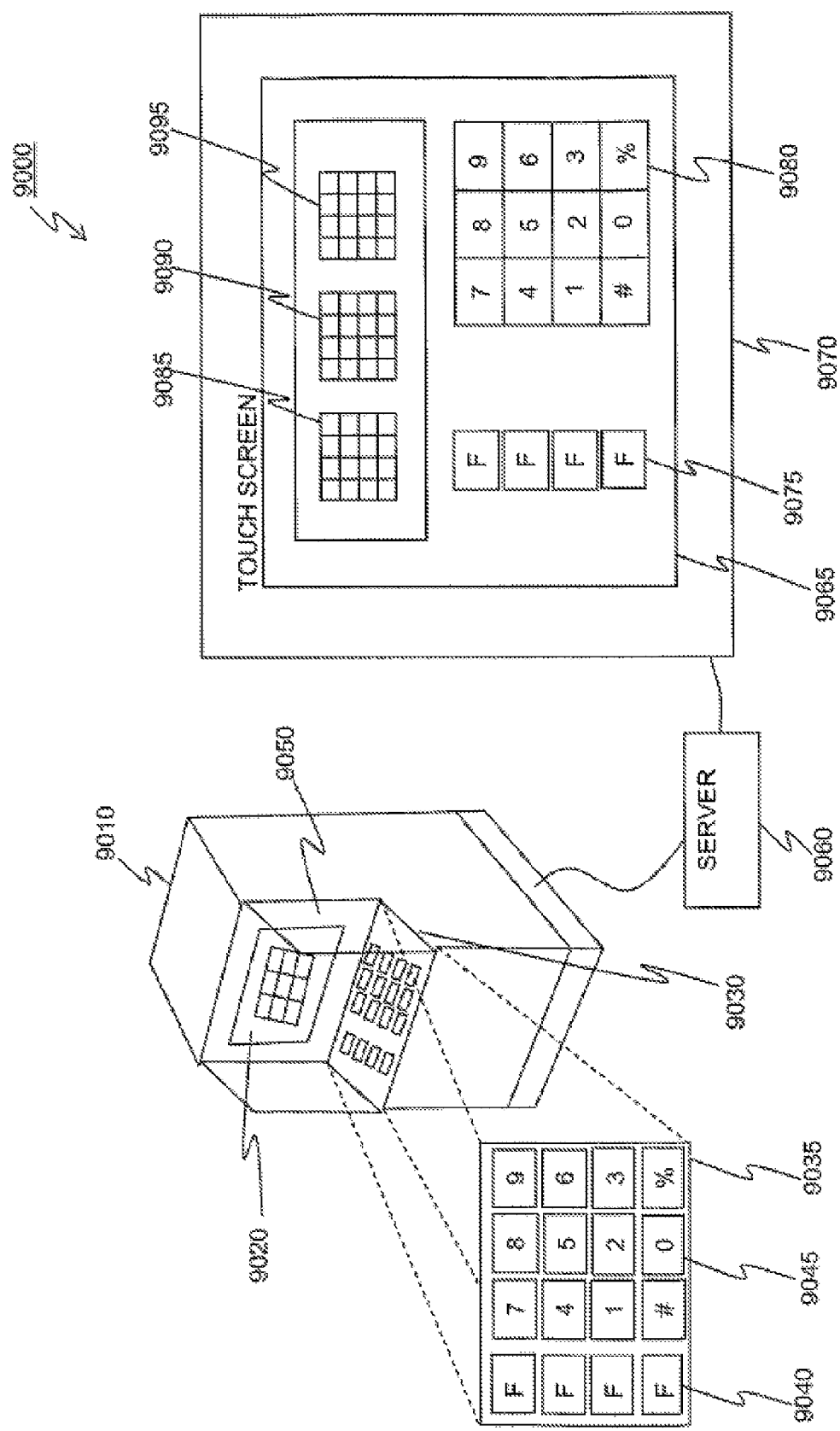
FIG. 9 is a schematic block diagram representation of a gaming system in accordance with an embodiment of the present disclosure.

FIG. 9 is a schematic block diagram representation of a gaming system 9000 in accordance with an embodiment of the present disclosure. The gaming system 9000 includes a land-based gaming terminal 9010, which is coupled to a server 9060 via a communications interface. The gaming terminal 9010 is suitable for installation in a casino, gaming hall, or other establishment that provides gaming facilities, and may be implemented, for example, using one or more features of the computer system 7000 of FIG. 7. In one implementation, the server 9060 is located remotely from the gaming terminal 9010.

The gaming terminal 9010 provides a player with a dedicated gaming terminal for playing a game in accordance with the present disclosure. The gaming terminal 9010 includes a display 9020 and a user interface 9030. The user interface 9030 receives commands from a player and can be implemented, for example, using keys, a touch screen, a computer mouse, a pointing device, a trackball, a scratchpad, or any combination thereof. In the embodiment shown, the gaming terminal 9010 also includes optional screens 9050 that provide a player of the gaming terminal 9010 with privacy from other players. The screens 9050 also shield the player of the gaming terminal 9010 from external distractions, resulting in a better gaming experience.

An exploded view 9035 of the user interface 9030 includes one or more function keys 9040 and a numeric keypad 9045. The display 9020 shows a gaming table in accordance with the present disclosure. In this arrangement, the gaming table is a 3×3 grid. As described above, the gaming table can take any shape or form that allows each cell of the gaming table to be associated with a unique identifier.

The server 9060 executes a computer-implemented gaming method in accordance with the present disclosure. In one arrangement, the server 9060 corresponds to the gaming server 5015 from FIG. 5. The server 9060 exchanges data with the gaming terminal 9010 to deliver a gaming experience to the player of the gaming terminal 9010. The server 9060 can be coupled to the gaming terminal 9010 via a communications network, a dedicated transmission line, a wireless communications link, a wired communication link, or other suitable transmission means. The server 9060 controls user registration, prize pools, and game interaction.

The player utilizes the user interface 9030 to select a cell of the gaming table and thus reveal a token stored therein. In one arrangement, the player selects another cell, thus revealing another token, and repeats the process until all of the cells have been selected and all of the tokens stored in the gaming table have been revealed. In another arrangement, the player enters an attack sequence, which provides a sequence of cells of the gaming table in the order in which tokens stored in those cells are to be revealed. Depending on the particular game, the sequence may include all of the cells of the gaming table. In an alternative arrangement, the player provides a first sequence that includes a predefined number of cells of the gaming table and the player is able to provide a subsequent sequence of cells to be revealed, in response to values associated with the tokens revealed when the first sequence is applied to the gaming table. In one arrangement, the player can modify a wager when entering the subsequent sequence.

The player also utilizes the user interface 9030 to populate one or more gaming tables with a set of tokens, wherein the populated gaming table is used to compete against another player. Interaction between competing players is controlled by a game controller executing on the server 9060.

The gaming system 9000 of FIG. 9 also shows a second gaming terminal 9070 that is coupled to the server 9060. The server 9060 can be coupled to the second gaming terminal 9070 via a communications network, a dedicated transmission line, a wireless communications link, a wired communication link, or other suitable transmission means.

The second gaming terminal 9070 provides a user interface in the form of a touch screen 9065. In this example, the touch screen 9065 includes a plurality of gaming tables 9085, 9090, 9095. In the example shown, each of the gaming tables 9085, 9090, 9095 is a 4×4 grid. The touch screen 9065 also includes one or more function keys 9075 and a numeric keypad 9080. The player can utilize the function keys 9075 and the numeric keypad 9080 to populate one or more of the gaming tables 9085, 9090, 9095 and to select cells of one or more of the gaming tables 9085, 9090, 9090 that are to be revealed. The player can also utilize the function keys 9075 and the numeric keypad 9080 to enter an attack sequence, which provides a sequence of cells of the respective gaming table in the order in which tokens stored in those cells are to be revealed.

In one arrangement, a player of the gaming terminal 9010 is able to compete against a player of the second gaming terminal 9070 or any other player of a gaming terminal coupled to the server 9060. The server 9060 controls exchange of data among the gaming terminals to allow players to compete against each other.

Preselection

According to a further embodiment of the present disclosure, a player preselects a gaming table and an attack sequence by populating cells of a gaming table with tokens and providing a sequence of attacking moves before a game commences. Such an embodiment allows a player to submit a populated gaming table and a sequence of attacking moves within a time before a game commences. The time can be a time defined by a computer on which the game is being played, for example, or can be the time up until the game is initiated, such as by pressing a "Start" button. In an alternative embodiment, the time is a scheduled date and time.

Preselecting a gaming table and an attack sequence allows a game to be played at a later time without the player necessarily being available at the time the game is actually played. In an online implementation of a gaming system in accordance with the present disclosure, a player is able to preselect a gaming table and an attack sequence when coupled to a game application, such as the game application 5025 of FIG. 5, and then compete in a game executed by the game application 5025 at a later time even if the player is offline and no longer connected to the game application 5025 at the time the game is executed.

In one embodiment, a player preselects an attacking sequence that is less than the required number of attacking moves required to complete a game. For example, the game described above with reference to FIG. 3 requires an attacking sequence of 9 moves. In this example, the player preselects a gaming table and an initial attacking sequence of less than 9 moves. The preselected gaming table and the initial attacking sequence are utilized for an initial phase of the match against a competing player who has also preselected a gaming table and an initial attacking sequence. In one implementation, once the initial phase is complete the player then selects further attacking moves in response to the competing player's moves, as described above with reference to steps 1020, 1025, and 1030 of FIG. 1.

In an alternative implementation, the player selects one or more successive attacking sequences that are less than or equal to the remaining number of moves required to complete the game. In a further implementation, a combination of attacking sequences and attacking moves are utilized. For example, the game described above with reference to FIG. 3 can be implemented with a player required to provide an initial attacking sequence of 3 moves, a second attacking sequence of 2 moves, and then 4 final moves in response to attacking moves of a competing player.

Any combination of attacking sequences and attacking moves can be implemented, depending on the particular application. For example, one implementation applies different rules to competing players for the attacking sequences and moves that are to be preselected. This can be utilized, for example, to provide a form of handicapping. A novice player may be allowed to choose each attacking move during game play, for example, thus allowing the player to respond to any pattern that might be identified from revealed tokens. However, an expert player may be required to preselect an entire attacking sequence for a game, thus preventing the expert player from responding to any pattern that might be identified from revealed tokens during game play.

In one embodiment, the player plays in a single player mode against an application executing on a processor in a computing device. The player preselects a gaming table and an attack sequence. The application populates a second gaming table, for example by using a random number generator, and generates a corresponding attack sequence to utilize against the player. The game then commences in the manner described above to determine a winner.

In an alternative embodiment, a plurality of competing players preselect respective gaming tables and attack sequences. In one implementation, a tournament is arranged for the competing players and the preselected gaming tables and attack sequences are utilized to determine a winner. The tournament can include, for example, a series of peer-to-peer matches in which a single player competes directly against another single player, with players being eliminated after each match. Alternatively, the tournament can include, for example, a round-robin tournament in which each player plays every other player an equal number of times. The tournament can also include a combination of peer-to-peer matches and round-robin matches.

The tournament can also include, for example, a master gaming board and master attack sequence, wherein each of the preselected gaming tables and attack sequences of the competing players is utilized in a peer-to-peer match against the master gaming board and master attack sequence to identify a winner. In one implementation, the master gaming board and master attack sequence are populated by a game application by using a random number generator.

As described above, a number of methods are available for resolving a drawn match, including for example: (i) splitting the prize; (ii) playing another game or a subset thereof; (iii) picking a number from a predefined range of numbers, with the winner being the player who selected a higher (or lower) number; (iv) "BLACK/RED"; (v) "pick the number"; (vi) "Closest guess"; (vii) "Best Last Play"; (viii) "Best Player"; (viii) "Lowest Number First"; or (ix) "Highest Number First".

A further method for determining a winner in the case of a drawn match is to assign one of the tokens or a plurality of the tokens that are utilized for populating the gaming table as a "draw breaking token". For example, one implementation of the method described above with reference to FIGS. 1 to 4 assigns the token with an associated value of "8" as the draw breaking token. The winner is the player who first found the draw breaking token during play of the game. When a plurality of tokens are used as the "draw breaking token", the winner is the player who first revealed all of the draw breaking tokens during play of the game.

Alternatively, a further game is played, wherein each player allocates a game breaking token to a cell of a draw gaming table. The game breaking token in this embodiment can also be one of the tokens utilized for populating the gaming table from the initial game or alternatively the game breaking token can be a new token. The draw gaming table can be the same as the gaming table on which the drawn game was played, or can be different from the gaming table on which the drawn game was played. When the draw gaming table is the same as the gaming table and the draw breaking token is preselected (i.e., the location of the draw breaking token is selected by the player(s) before the initial game is played), the sequence of attacking moves from the initial, drawn match can be applied to the respective draw gaming tables to identify the location of the draw breaking tokens and thus determine a winner. Alternatively, a further sequence of preselected attacking moves is applied to the respective draw gaming tables.

In a peer-to-peer game in which the draw breaking token has not been preselected, the players involved in the drawn match place a respective game breaking token in a cell of their respective draw gaming tables and then take turns to select a cell of the drawn gaming table of the other player in an attempt to identify the game breaking token. The player that identifies the game breaking token of the other player in fewer moves is the winner. In one implementation, each player preselects a location of the draw breaking token before play of the initial game commences. In an alternative implementation, each player provides a preselected draw sequence of attacking moves to be utilized for identifying the location of the draw breaking token. The placing by the players of the draw breaking token and any preselection of a draw sequence of attacking moves can be required before the initial game commences or can occur in response to the draw, or a combination thereof.

In a further preselection embodiment, a player provides a preselected "draw round selection". The draw round selection is utilized to determine a winner in the case in which a preceding game results in a draw. The actual nature of a draw round selection chosen by a player is dependent on the manner of resolution that is in effect for that particular gaming implementation.

For example, for an implementation that utilizes the "BLACK/RED" method, a player selects a "draw round selection" of either BLACK or RED. Similarly, for an implementation that utilizes the "play another game" method, a player provides another populated gaming table for use in resolving a draw. In one implementation, the player also provides a preselected draw attack sequence. In an alternative implementation, the original attack sequence is used in conjunction with the populated gaming table that was provided for use in resolving the draw.

Depending on the particular implementation, a player may be required to preselect a gaming table, an attack sequence, a draw round selection, or any combination thereof.

FIG. 8A is a schematic block diagram representation of a preselection interface 8100 that can be utilized by a player to preselect a gaming table and an attack sequence in accordance with an embodiment of the present disclosure. In this embodiment, a draw is resolved by identifying a game breaking token in a draw breaking table. The preselection interface 8100 includes a gaming table 8110 and an array 8120 for storing an attack sequence. The gaming table 8110 includes a number of cells corresponding to a predefined number of tokens. In the example shown in FIG. 8A, the gaming table 8110 corresponds to the example described above with respect to FIG. 1, in which 9 tokens are utilized.

As described above, the player populates the gaming table 8110 by allocating each of the tokens to a corresponding cell of the gaming table 8110. In the preselection implementation, the player also selects an attack sequence before the game commences and the attack sequence is stored in the array 8220. Thus, the sequence of attacking moves is preselected, and individual attacking moves are not made in response to an attack from a competing player.

The preselection interface 8100 also includes a draw round selection table 8130. In this implementation, a draw is resolved by using the method described above in which a draw breaking token is placed in a draw gaming table 8130. In the example of FIG. 8A, the draw gaming table 8130 corresponds to the gaming table 8110. The player preselects the draw breaking token by placing the draw breaking token in a single cell of the draw gaming table 8130. In this particular example, the predefined tokens and gaming table correspond to the example of FIGS. 1 to 3, and token "8" is assigned to be the draw breaking token. As can be seen from the draw breaking table 8130, the player has preselected cell B2 as the location of the draw breaking token.

The preselected attack sequence stored in the array 8120 and utilized in the initial, drawn game is utilized in conjunction with the draw round selection table 8130 and a corresponding attack sequence and draw round selection table from a competing player to identify a winner. The winner is the player that identifies the draw breaking token of the competing player in fewer moves.

In the scenario in which the gaming table and the draw breaking table are the same and the draw breaking token is one of the tokens for populating the gaming table, a single gaming table can be utilized, with the location of the draw breaking token preselected by identifying a cell of the gaming table. For example, with reference to FIG. 8A a player can preselect the gaming table by populating the cells with tokens from 1 to 9 and then select any one of those cells for the draw breaking token.

Figure 8B:
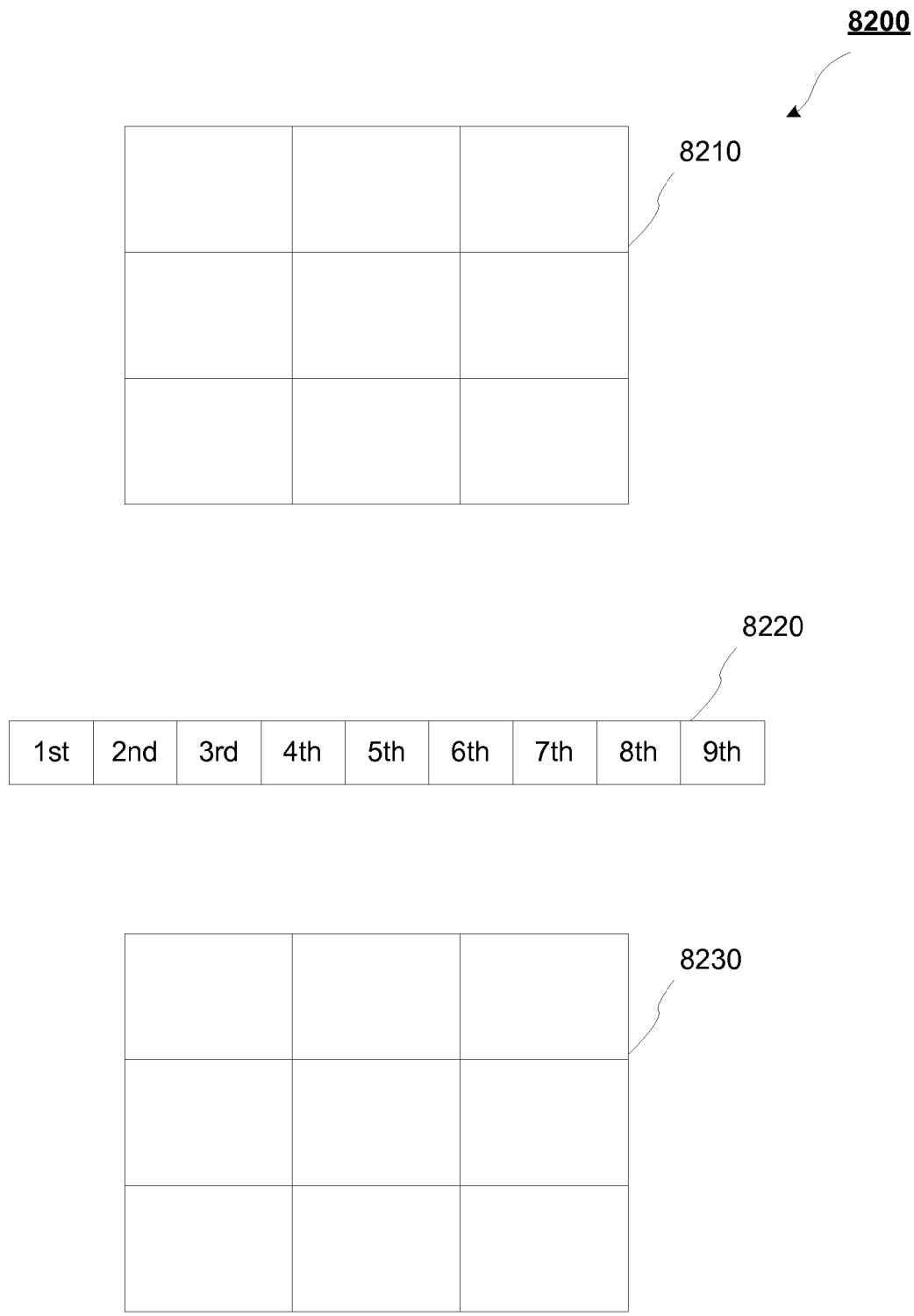

FIG. 8B is a schematic block diagram representation of a preselection interface 8200 that can be utilized by a player to preselect a gaming table and an attack sequence in accordance with an embodiment of the present disclosure. In this embodiment, a draw is resolved by playing a new game that utilizes the attack sequences from the drawn game. The preselection interface 8200 includes a gaming table 8210 and an array 8220 for storing an attack sequence. The gaming table 8210 includes a number of cells corresponding to a predefined number of tokens. As described above, the player populates the gaming table 8210 by allocating each of the tokens to a corresponding cell of the gaming table 8210. In the preselection implementation, the player also selects an attack sequence before the game commences and the attack sequence is stored in the array 8220. Thus, the sequence of attacking moves is preselected, and individual attacking moves are not made in response to an attack from a competing player.

The preselection interface 8200 also includes a draw round selection table 8230. In this implementation, a draw is resolved by playing a new game. In the example of FIG. 8B, the draw gaming table 8230 corresponds to the gaming table 8210. The player preselects the draw breaking table by populating the table 8230 with a set of predefined draw breaking tokens. In one implementation, the draw breaking tokens correspond to the tokens utilized in the gaming table 8210. In an alternative implementation, the draw breaking tokens are different from the tokens utilized in the gaming table 8210. For example, in one implementation larger values are associated with the draw breaking tokens in order to create larger scores, which in turn reduces the chance of a further draw and thus provides a greater chance of identifying a winner. In this particular example, the preselected attack sequence stored in the array 8220 is applied to a draw gaming table of the competing player and an attack sequence utilized by the competing player during the drawn match is applied to the draw gaming table 8230 to identify a winner.

Figure 8C:
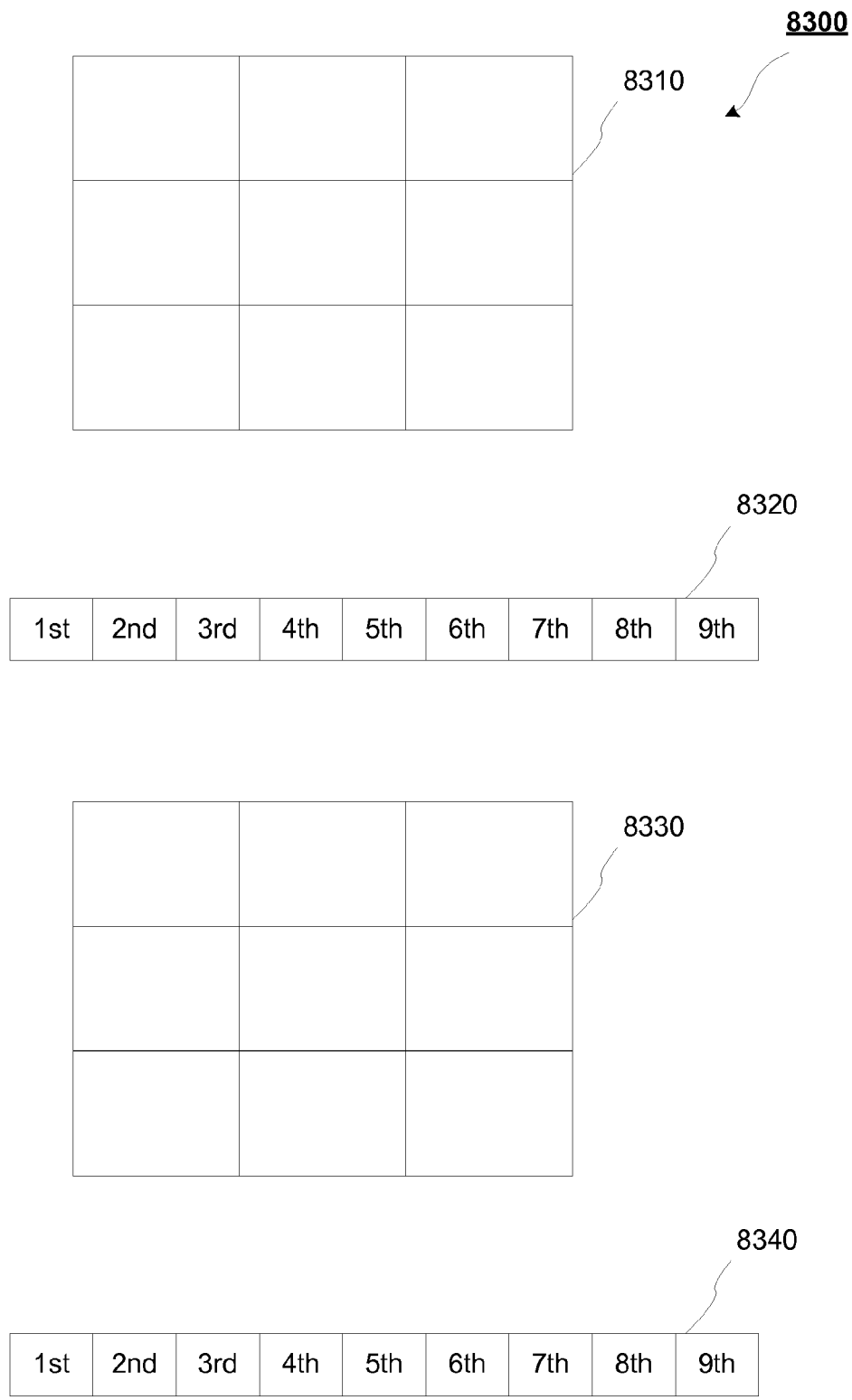

FIG. 8C is a schematic block diagram representation of a preselection interface 8300 that can be utilized by a player to preselect a gaming table and an attack sequence in accordance with an embodiment of the present disclosure. In this embodiment, a draw is resolved by playing a new game with a new attack sequence. The preselection interface 8300 includes a gaming table 8310 and an array 8320 for storing an attack sequence. The gaming table 8310 includes a number of cells corresponding to a predefined number of tokens. In the example shown in FIG. 8C, the gaming table 8310 corresponds to the example described above with respect to FIG. 1, in which 9 tokens are utilized.

As described above, the player populates the gaming table 8310 by allocating each of the tokens to a corresponding cell of the gaming table 8310. In the preselection implementation, the player also selects an attack sequence before the game commences and the attack sequence is stored in the array 8320. Thus, the sequence of attacking moves is preselected, and individual attacking moves are not made in response to an attack from a competing player.

As indicated above, in this embodiment a draw is resolved by playing a new game with a new attack sequence. Accordingly, the preselection interface 8300 also includes a draw round selection table 8330 and a draw attack sequence array 8340. The player preselects the draw breaking table by populating the draw breaking table 8330 with a set of draw breaking tokens. In one implementation, the set of draw breaking tokens is equal to the number of cells on the draw breaking table 8330. In an alternative implementation, a single draw breaking token is placed in the draw breaking table 8330.

The player preselects the draw attack sequence array 8340 by providing a sequence of attacking moves to be utilized in the event that a draw occurs from the initial game. In the example of FIG. 8C, the gaming table 8310 and the draw breaking table 8330 are the same shape and configuration, with the same number of cells. However, the gaming table 8310 and the draw breaking table 8330 can equally be different from each other. In the event that the initial game is a draw, the draw attack sequence stored in the draw attack sequence array 8340 is applied to a draw gaming table of a competing player and a draw attack sequence preselected by the competing player is applied to the draw gaming table 8330 to identify a winner. In the case in which a single draw breaking token is utilized, the winner is the player whose attacking sequence identifies the draw breaking token of the competing player in fewer moves.

An example of multiple players playing a preselected game will now be described with reference to FIG. 5. In this example, a first player and a second player register to play a game by purchasing first and second tickets, respectively. The first and second tickets provide the respective first and second players with a chance to win a portion of a prize controlled by a game administrator. In this particular example, the game administrator controls the gaming server 5015 and the first and second players are registered in the game database 5036 upon purchase of the respective first and second tickets.

In one implementation, the purchase of a ticket involves the preselection of a gaming table and an attack sequence. The preselection of the gaming table and attack sequence are completed by the player purchasing the ticket. In an alternative implementation, the player can optionally select to have a preselected gaming table and attack sequence provided by the game administrator. Depending on the particular implementation, a ticket can be associated with a single gaming table and attack sequence or multiple gaming tables and corresponding attack sequences. Pricing may vary, depending on the number of gaming tables associated with each ticket.

In the example of FIG. 5, the first player utilizes the mobile browser 5005 to interact with the gaming server 5015 to purchase the first ticket. Similarly, the second player utilizes the mobile browser 5050 to interact with the gaming server 5015 to purchase the second ticket. In an alternative implementation, a player purchases a ticket from a retail outlet that interacts with the gaming server 5015.

Each player that is registered with the gaming server 5015 before a predefined deadline has a chance of sharing a portion of a prize pool. In one implementation, the gaming server provides a master gaming board and master attack sequence and each preselected gaming table and attack sequence competes against the master gaming board and master attack sequence to identify one or more winners based on the resulting scores. For example, all players that attain a score greater than or equal to a predetermined threshold may enter a subsequent stage of the game. In one particular implementation, the identified winners then compete against one another in a tournament to identify an ultimate winner. As described above, the tournament may include round-robin matches, peer-to-peer matches, or a combination thereof. In one embodiment, the identified winners utilize the same preselected gaming table and attack sequences in the tournament against one another. The tickets can optionally include a draw resolution selection to assist in allocating prizes among players.

In a further embodiment, a first player preselects a first gaming table and a first attack sequence by populating cells of the first gaming table with tokens and providing a first attack sequence of attacking moves. The first player submits a request, via a gaming server, to a second player to compete against each other. The first player also submits the populated first gaming table and the first attack sequence to the gaming server. In one implementation, the first gaming table and the first attack sequence are provided to the gaming server in the form of a unitary computer file, multiple computer files, an SMS message, or any combination thereof. Other implementations may equally be practiced without departing from the spirit and scope of the invention.

The second player receives the request, which may be as soon as the request is sent or at any later time, such as when the second player next logs on to a website coupled to the gaming server. When the second player accepts the request, the second player populates a second gaming table with tokens and provides a second sequence of attacking moves. The second player submits the second gaming table and the second attack sequence to the gaming server and the game is then initiated, with a winner being determined almost instantaneously. Thus, the second player receives a result shortly after accepting the request and providing the second gaming table and second attack sequence. This may be minutes, hours, days, or even months after the request from the first player. The first player is then notified of the result. Such notification may occur, for example, via e-mail, SMS, Facebook wall, MySpace, or via an application residing on the gaming server.

In an alternative implementation, the first and second players each provide an attack sequence, and the gaming server populates a single gaming table. The attack sequences provided by the first and second players are applied to the gaming table and a winner is subsequently determined.

Conclusion

The present disclosure provides a method of gaming utilizing a first gaming table and a predefined number of first tokens. The first gaming table includes a plurality of cells corresponding to the number of first tokens and each cell of the first gaming table is associated with a unique identifier. This enables a player to readily identify a cell to be populated or selected. Each of the first tokens has an associated value. In one embodiment, relative differences between consecutively revealed tokens are utilized to compute a score for the player. This score can be computed at the end of a game, or interim scores can be displayed during game play.

The method includes the step of populating the first gaming table by storing each of the first tokens in one of the cells of the first gaming table. Population of the cells can be performed by a game controller. Alternatively, the cells of the first gaming table are populated in response to commands from a competing player.

The first player provides selection commands to select one of the cells of the first gaming table to reveal one of the first tokens stored therein. The first player provides further selection commands until each of the first tokens has been revealed. The first player can provide each selection command individually, with a first token revealed before a further selection command is provided. Alternatively, the first player provides a sequence of selection commands, in which first tokens corresponding to cells identified in the sequence of selection commands are revealed. The sequence of selection commands can correspond to the number of first tokens, or any subset thereof.

The method utilizes the values associated with the first tokens to determine a score for the first player, based on an order in which the first tokens were revealed. Utilizing the values to determine the score can be based on relative differences between values associated with consecutively selected first tokens. Alternatively, a predefined ordered sequence of values can be used to determine the score by comparing values associated with the selected tokens to corresponding values in the predefined ordered sequence of values. Thus, the order in which the first tokens are revealed has a direct impact on the score for the first player.

In the example in which the cells of the first gaming table are populated in response to commands from a competing player, the first player can seek to improve his or her score by attempting to identify patterns of behavior relating to the competing player. This may be based, for example, on information relating to gaming tables previously populated by the competing player. Such information may be collected by the first player or may be provided in varying levels of detail by a system implementing a method in accordance with the present disclosure.

It is apparent from the above that the arrangements described are applicable to the computer, telecommunications and gaming industries.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

What is claimed:

1. A method of gaming utilizing a first gaming table and a predefined number of first tokens, wherein said first gaming table includes a plurality of cells corresponding to said number of first tokens, each cell of said first gaming table being associated with a unique identifier, and further wherein each of said first tokens has an associated value, said method comprising the steps of:
  populating said first gaming table by storing each of said first tokens in one of said cells of said first gaming table;
  iteratively selecting, by a first player, one of said cells of said first gaming table to reveal one of said first tokens stored therein, until each of said first tokens has been revealed; and
  determining a score for said first player, based on relative differences between values associated with consecutively selected first tokens.

2. The method according to claim 1, utilizing a second gaming table and a predefined number of second tokens, wherein said second gaming table includes a plurality of cells corresponding to said number of second tokens, each cell of said second gaming table being associated with a unique identifier, and further wherein each of said second tokens has an associated value, said method comprising the further steps of:
  populating said second gaming table by storing each of said second tokens in one of said cells of said second gaming table;
  iteratively selecting, by said second player, one of said cells of said second gaming table to reveal one of said second tokens stored therein, until each of said second tokens has been revealed; and
  determining a score for said second player, based on relative differences between values associated with consecutively selected second tokens.

3. The method according to claim 2,
  wherein said populating of said first gaming board is performed by said second player and said populating of said second gaming board is performed by said first player, and
  further wherein said first player and said second player take turns to select cells from said respective first and second gaming tables,
  said method comprising the further step of:
  utilizing said score for said first player and said score for said second player to identify a winner.

4. The method according to claim 2,
  wherein said populating of said first gaming board is performed by said second player and said populating of said second gaming board is performed by said first player, and further wherein:
  said selection, by said first player, of cells of said first gaming table is based on a first sequence of cells provided by said first player, and
  said selection, by said second player, of cells of said second gaming table is based on a second sequence of cells provided by said second player,
  said method comprising the further step of:
  utilizing said score for said first player and said score for said second player to identify a winner.

5. The method according to claim 2,
  wherein said score for said first player is determined by utilizing an order in which said first tokens were revealed to calculate a first set of absolute values corresponding to absolute values between the values associated with consecutively selected first tokens, said score for said first player being the sum of the first set of absolute values; and
  wherein said score for said second player is determined by utilizing an order in which said second tokens were revealed to calculate a second set of absolute values corresponding to absolute values between the values associated with consecutively selected second tokens, said score for said second player being the sum of the second set of absolute values.

6. The method according to claim 2,
  wherein said first gaming table is selected from a first set of gaming tables consisting of: a 2×2 grid of cells, a 3×3 grid of cells, a 4×4 grid of cells, and a 5×5 grid of cells; and
  wherein said second gaming table is selected from a second set of gaming tables consisting of: a 2×2 grid of cells, a 3×3 grid of cells, a 4×4 grid of cells, and a 5×5 grid of cells.

7. The method according to claim 1, further comprising the steps of:
  determining an initial score based on a relative difference between a predefined starting value and a value associated with a first revealed token; and
  utilizing said initial score to determine said score for said first player.

8. The method according to claim 1, further comprising the steps of:
  determining a finishing score based on a relative difference between a predefined finishing value and a value associated with a final revealed token; and
  utilizing said finishing score to determine said score for said first player.

9. A computer program product having a non-transitory computer readable medium having a computer program recorded therein for gaming, said computer program product comprising:
  computer program code means for displaying a first gaming table and a predefined number of first tokens, wherein said first gaming table includes a plurality of cells corresponding to said number of first tokens, each cell of said first gaming table being associated with a unique identifier, and further wherein each of said first tokens has an associated value;
  computer program code means for populating said first gaming table by storing each of said first tokens in one of said cells of said first gaming table;
  computer program code means for receiving iterative selections, by a first player, of one of said cells of said first gaming table to reveal one of said first tokens stored therein, until each of said first tokens has been revealed; and
  computer program code means for utilizing relative differences between values associated with consecutively selected first tokens to determine a first score for said first player.

10. The computer program product according to claim 9, wherein said populating is performed in response to received commands.

11. The computer program product according to claim 9, wherein said populating is performed by a game application.

12. A method of gaming utilizing a first gaming table and a predefined number of first tokens, wherein said first gaming table includes a plurality of cells corresponding to said number of first tokens, each cell of said first gaming table being associated with a unique identifier, and further wherein each of said first tokens has an associated value, said method comprising the steps of:
populating said first gaming table by storing each of said first tokens in one of said cells of said first gaming table;
iteratively selecting, by a first player, one of said cells of said first gaming table to reveal one of said first tokens stored therein, until each of said first tokens has been revealed; and
utilizing said values associated with said first tokens to determine a score for said first player, based on an order in which said first tokens were revealed and a predefined ordered sequence of values.

13. The method according to claim 12, wherein utilizing said values associated with said first tokens to determine a score comprises the further steps of:
for each of said first tokens, determining an intermediate score based on a relative difference between the value associated with the first token and a value in said predefined ordered sequence of values corresponding to the order in which the first token was revealed; and summing each of said intermediate scores.

14. The method according to claim 12, wherein said predefined sequence of ordered tokens corresponds to a sequence of numbered turns.

15. The method according to claim 12, wherein said predefined sequence of ordered tokens is defined by one of a gaming administrator, a competing player, and a random number generator.

16. A computer program product having a non-transitory computer readable medium having a computer program recorded therein for gaming, said computer program product comprising:
computer program code means for displaying a first gaming table and a predefined number of first tokens, wherein said first gaming table includes a plurality of cells corresponding to said number of first tokens, each cell of said first gaming table being associated with a unique identifier, and further wherein each of said first tokens has an associated value;
computer program code means for populating said first gaming table by storing each of said first tokens in one of said cells of said first gaming table;
computer program code means for receiving iterative selections, by a first player, of one of said cells of said first gaming table to reveal one of said first tokens stored therein, until each of said first tokens has been revealed; and
computer program code means for utilizing said values associated with said first tokens to determine a score for said first player, based on an order in which said first tokens were revealed and a predefined ordered sequence of values.

* * * * *

UNITED STATES PATENT AND TRADEMARK OFFICE
CERTIFICATE OF CORRECTION

PATENT NO. : 8,393,947 B2  Page 1 of 1
APPLICATION NO. : 13/021503
DATED : March 12, 2013
INVENTOR(S) : Anthony Robert Farah It is certified that error appears in the above-identified patent and that said Letters Patent is hereby corrected as shown below:

Title page, Col. 2

Foreign patent documents, insert:

--Australia 2008904616  09/05/2008
  Australia 2008904067  08/08/2008
  Australia 2010200417  02/05/2010--

Signed and Sealed this
Third Day of December, 2013

Margaret A. Focarino
*Commissioner for Patents of the United States Patent and Trademark Office*